(12) United States Patent
Watatani et al.

(10) Patent No.: US 8,338,744 B2
(45) Date of Patent: Dec. 25, 2012

(54) CONDENSING OPTICAL SYSTEM, LASER PROCESSING METHOD AND APPARATUS, AND MANUFACTURING METHOD OF BRITTLE MATERIAL BLANK

(75) Inventors: Kenichi Watatani, Itami (JP); Keiji Fuse, Osaka (JP); Yutaka Kobayashi, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 760 days.

(21) Appl. No.: 12/516,336

(22) PCT Filed: Nov. 29, 2007

(86) PCT No.: PCT/JP2007/073079
§ 371 (c)(1),
(2), (4) Date: May 26, 2009

(87) PCT Pub. No.: WO2008/069099
PCT Pub. Date: Jun. 12, 2008

(65) Prior Publication Data
US 2010/0065537 A1    Mar. 18, 2010

(30) Foreign Application Priority Data

Nov. 30, 2006 (JP) ................................. 2006-324409
Nov. 30, 2006 (JP) ................................. 2006-324439

(51) Int. Cl.
*B23K 26/00* (2006.01)
*G02B 19/00* (2006.01)

(52) U.S. Cl. ............. 219/121.67; 219/121.72; 359/368; 359/677; 359/724; 369/112.23

(58) Field of Classification Search .................. 359/368, 359/677, 724; 219/121.67, 121.72; 369/44.32, 369/112.23
See application file for complete search history.

(56) References Cited

U.S. PATENT DOCUMENTS
2,576,011 A * 11/1951 Grey ............................ 359/731
(Continued)

FOREIGN PATENT DOCUMENTS
GB          2337720 A    *  1/1999
(Continued)

OTHER PUBLICATIONS

Chinese Office Action for corresponding CN Application No. 200780044321.X, dated Mar. 30, 2011, pp. 1-18 China.

(Continued)

*Primary Examiner* — Samuel M Heinrich
(74) *Attorney, Agent, or Firm* — Ditthavong Mori & Steiner, P.C.

(57) ABSTRACT

A condensing optical system having a condensed light spot with a small size and a large focal depth without causing a problem of a decrease in intensity of the condensed light spot or discontinuity of an intensity distribution in front and rear areas of a focal position is provided. The condensing optical system that condenses a laser beam generated by a laser source at a predetermined focal length is designed to satisfy Expressions (a) to (d), thereby producing 3rd and 5th spherical aberrations:

$$|Z_8|\geq 0.1\lambda \text{ or } |Z_{15}|\geq 0.05\lambda, \quad\quad (a)$$

$$Z_8/Z_{15}\geq 3 \text{ or } Z_8/Z_{15}<1, \quad\quad (b)$$

$$|Z_8|<1.4\lambda, \text{ and} \quad\quad (c)$$

$$|Z_{15}|<0.5\lambda, \quad\quad (d)$$

where $\lambda$ is a wavelength, $Z_8$ is an 8th coefficient of coefficients of the Zernike fringe polynomial of wavefront aberration corresponding to a 3rd order spherical aberration, and $Z_{15}$ is a 15th coefficient of the coefficients of the Zernike fringe polynomial of wavefront aberration corresponding to a 5th spherical aberration.

13 Claims, 25 Drawing Sheets

U.S. PATENT DOCUMENTS

| | | | | |
|---|---|---|---|---|
| 5,638,211 | A | * | 6/1997 | Shiraishi .................. 359/559 |
| 2003/0234970 | A1 | * | 12/2003 | Phillips et al. ............. 359/291 |
| 2006/0016892 | A1 | | 1/2006 | Vinogradov et al. |

FOREIGN PATENT DOCUMENTS

| | | | |
|---|---|---|---|
| JP | 964444 | A | 3/1997 |
| JP | 2664625 | B2 | 6/1997 |
| JP | 200223099 | A | 1/2002 |
| JP | 2002517315 | A | 6/2002 |
| JP | 200362683 | A | 3/2003 |
| JP | 3449986 | B2 | 7/2003 |
| JP | 2004-528991 | A | 9/2004 |
| JP | 3616872 | B2 | 11/2004 |
| JP | 2005-257735 | A | 9/2005 |
| JP | 2006-043744 | A | 2/2006 |
| JP | 2006-165398 | A | 6/2006 |
| JP | 2006-237184 | A | 9/2006 |
| JP | 2006-272005 | A | 10/2006 |
| JP | 200769216 | A | 3/2007 |
| WO | WO 02/100587 | A1 | 12/2002 |

OTHER PUBLICATIONS

Japanese Office Action for related Japanese Patent Application No. 2006-324409 dated Feb. 28, 2012, pp. 1-7.

Japanese Office Action for corresponding JP Application No. 2006-324439, dated Nov. 30, 2010, pp. 1-5 Japan.

Japanese Office Action with Partial English Translation for corresponding JP Application No. 2006-324409, dated Sep. 25, 2012, pp. 1-5.

\* cited by examiner (a)

(b)

(c)

(a)

(b)

(a)

(b)

CONDENSING OPTICAL SYSTEM, LASER PROCESSING METHOD AND APPARATUS, AND MANUFACTURING METHOD OF BRITTLE MATERIAL BLANK

TECHNICAL FIELD

The present invention relates to a condensing optical system, laser processing method and apparatus, and a manufacturing method of a brittle material blank. More particularly, the present invention relates to a condensing optical system that condenses a laser beam into a very small spot with a large focal depth; to laser processing method and apparatus that cut a workpiece made of a brittle material such as single crystal diamond or form a groove in a surface of the brittle material with the condensed laser beam; and to a manufacturing method that manufactures various members made of the brittle material.

BACKGROUND ART

Laser beams are applied to various fields today. For example, a laser processing technique is developing rapidly. The laser processing technique is desired to provide processing to a smaller material with a higher precision. It is necessary to condense a laser beam into a smaller spot. To attain this, a method is conceivable in which a numerical aperture of a condensing optical system is increased, or an F number of the condensing optical system is decreased to provide a lens with a high brightness. When a lens with a small focal length and a high brightness is used, a spot size is decreased in proportion to the focal length as long as aberration is suppressed; however, a focal depth is decreased. Hence, an extremely high precision is required during focusing onto a surface of a workpiece. In addition, it is difficult to process a material with a large thickness. To address such a problem, a condensing optical system is suggested, in which a focal depth is increased without a spot size being changed.

For example, Japanese Patent No. 2664625 discloses a condensing optical system in which a lens surface is concentrically divided into a plurality of subfields, so that the lens serves as a multifocal lens having the subfields with slightly different focal lengths. Positions of light spots condensed by the subfields are mutually shifted from each other, and a focal depth is apparently increased. Also, for example, Japanese Unexamined Patent Application Publication No. 9-64444 discloses a condensing optical system which employs a Bessel beam. This beam is condensed into a very small spot, and a focal depth is markedly increased.

However, with the condensing optical system disclosed in Japanese Patent No. 2664625, the laser beam is divided at the lens surface and their focuses are discontinuously connected. The spot sizes and intensity distributions may vary in the subfields. Hence, an intensity distribution may be discontinued in front and rear areas of a focal position. With the condensing optical system disclosed in Japanese Unexamined Patent Application Publication No. 9-64444, although the Bessel beam has the large focal depth, a laser beam condensed into a certain spot is merely a part of entire incident light. Thus, the intensity of the spot is considerably small, and is not suitable for processing which requires high intensity.

Meanwhile, a brittle material, such as single crystal diamond, sintered polycrystalline diamond, sintered cubic boron nitride, or cemented carbide, includes a highly covalent substance and has a high melting point and a high hardness. Hence, it is difficult to machine such a material. Owing to this, the above-described condensing optical system is used to cut the brittle material or to form a groove in the brittle material by irradiating the brittle material with a laser beam (for example, see Japanese Patent No. 3449986, Japanese Unexamined Patent Application Publication No. 2003-62683, or Japanese Patent No. 3616872).

For example, when a brittle material is to be cut, a condensing lens condenses a laser beam emitted from a laser oscillator, and the brittle material arranged at a focal position of the condensing lens is irradiated with the condensed laser beam, to cut the brittle material.

Regarding the condensing optical system to obtain the laser beam, a conventional condensing lens formed of a spherical lens has a characteristic that, when a laser beam whose light intensity distribution is in an ideal Gaussian form is incident, the form of the laser beam is converted into a reduced Gaussian form as shown in FIG. 40.

When a brittle material is cut with a laser beam passing through the condensing lens with the characteristic, a defect, such as chipping, taper (inclination with respect to an expected work surface), or dulling, may occur in a cut surface at a laser exit side. This is possibly because the laser beam exhibits change in beam diameter or change in optical power density, the change being symmetric in an optical-axis direction about a light condensed point (see FIG. 41). When a brittle material is laser processed to make a cutting tool, merely cutting the material is insufficient. Finishing precision of an "edge" is essential to a cutting tool. If a defect occurs at an edge portion, repairing the defect may need considerable work hours and costs.

Thus, in cutting using the conventional condensing lens, in order to suppress occurrence of chipping or the like, the number of laser scanning operations is increased, the width of cutting is increased, or both measures are employed to allow the laser beam to sufficiently reach the inside of a brittle material.

However, when the number of laser scanning operations is increased, a processing speed is decreased. When the width of cutting is increased, a loss of the material is increased. Further, with the conventional method, although the occurrence of taper or dulling may be suppressed by a certain degree, it is difficult to completely prevent such a defect.

DISCLOSURE OF INVENTION

In light of the above-described problems of the conventional techniques, an object of the present invention is to provide a condensing optical system with a small spot size and a large focal depth without causing a problem, such as discontinuity of an intensity distribution in front and rear areas of a focal position, or a decrease in intensity of the spot.

Also, an object of the present invention is to provide a processing method of a brittle material and a manufacturing method of a brittle material blank, the method being capable of increasing a processing speed and providing high quality processing without causing taper or dulling.

A condensing optical system according to the present invention condenses a laser beam generated by a laser source at a predetermined focal length, and produces spherical aberration (claim 1). Since the condensing optical system of the present invention produces the spherical aberration, the spherical aberration affects a focal depth, thereby providing a large focal depth while a size of a condensed light spot is held small. In addition, unlike the conventional multifocal lens, focal positions of laser beams are not discontinuously connected, and the Bessel beam does not have to be employed. An intensity distribution is not discontinued in front and rear areas of the focal position, and the intensity of the spot is not decreased.

In the present invention, in particular, to produce the spherical aberration that increases the focal depth, the condensing optical system may preferably satisfy Expressions (a) and (b) as follows:

$$|Z_8| \geqq 0.1\lambda \text{ or } |Z_{15}| \geqq 0.05\lambda, \text{ and} \quad (a)$$

$$Z_8/Z_{15} \geqq 3 \text{ or } Z_8/Z_{15} < 1, \quad (b)$$

where $\lambda$ is a wavelength, $Z_8$ is an 8th coefficient of coefficients of the Zernike fringe polynomial of wavefront aberration corresponding to a 3rd order spherical aberration, and $Z_{15}$ is a 15th coefficient of the coefficients of the Zernike fringe polynomial of wavefront aberration corresponding to a 5th spherical aberration.

In the present invention, further, Expressions (c) and (d) may be preferably satisfied as follows:

$$|Z_8| < 1.4\lambda, \text{ and} \quad (c)$$

$$|Z_{15}| < 0.5\lambda. \quad (d)$$

Accordingly, the high intensity can be provided while the large focal depth and the small spot size are held.

The condensing optical system of the present invention may be, for example, a single aspherical lens or a single diffractive condensing lens. Alternatively, the condensing optical system may be a compound optical system including at least two optical components.

Also, the compound optical system may include, for example, first optical means having a light condensing function and second optical means having a spherical aberration producing function. The second optical means may be, for example, an aspherical phase plate or a diffractive phase plate.

Also, the condensing optical system of the present invention may further include laser beam deflecting means which is a polygonal mirror or a galvanometer mirror, in which the first optical means is an fθ lens. Accordingly, the small spot with the large focal depth can scan on a focal plane at a high speed.

A laser processing method according to the present invention includes irradiating a material with a laser beam to process the material by using the condensing optical system according to claim 1. The method is configured as follows.

An $M^2$ value which indicates a light condensing property of the laser beam is $M^2 < 2$, and the wavelength $\lambda$ of the laser beam is 100 nm $< \lambda <$ 20000 nm.

Also, change in peak power density of the laser beam in an optical-axis direction is asymmetric about a focal position of the laser beam through the condensing optical system (claim 9).

With the laser processing method of the present invention, the material is processed with the laser beam whose change in peak power density in the optical-axis direction is asymmetric about the focal position of the laser beam through the condensing optical system. That is, the material is processed with the laser beam configured such that, when the laser beam having a light intensity distribution with an ideal Gaussian form is incident, change in beam diameter or change in power density in the optical-axis direction becomes asymmetric about the focal position of the laser beam, and that a cross-sectional intensity distribution of the laser beam during propagation contains a part with a non-Gaussian form.

For example, when the peak power density is asymmetric such that a condition with a high peak power density more frequently appears at the rear side of the focal position of the laser beam (far side from the lens), the condition with the high peak power density is held in an area near the inside of the material with respect to the focal position. Thus, energy of the laser beam can be efficiently absorbed by the material. As a result, for example, when cutting is performed, cutting at a higher speed than the speed with the conventional condensing lens can be provided. Also, an enter length of the energy to the inside of the material can be adjusted by adjusting the asymmetric property of the peak power density. The entering of unnecessary energy to the inside of the material can be suppressed. Accordingly, a problem such as chipping, taper, or dulling is reliably prevented at the laser exit side. The material surface can be processed with high precision.

In contrast, when the peak power density is asymmetric such that the condition with the high peak power density more frequently appears at the lens side for the material, a rapid increase in power density can be obtained. For example, processing, such as boring in a transparent material or forming of a micro crack, in which energy is locally absorbed into the surface or inside of the material, is properly performed.

Further, by adjusting the asymmetric property of the change in peak power density, the configuration can be applied to reforming of a surface of a material, or annealing of a semiconductor. In the annealing of the semiconductor, the asymmetric property of the change in peak power density is adjusted, and hence, a depth profile of a dopant can be adjusted.

The peak power density of the laser beam may be changed such that X1/X2 is in a range of $1 < X1/X2 \leqq 10$ where X1 is a larger distance and X2 is a smaller distance from the focal position when the peak power density of the laser beam is decreased to a half maximum about the focal position as a central axis. The peak power density is held with an intensity for processing a material, and the peak power density is asymmetric about the focal position. Accordingly, high speed and high quality processing of the material can be performed.

The material may be cut with the laser beam, the peak power density of the laser beam being changed to be asymmetric about the focal position so that X2 is arranged at a lens side and X1 is arranged at a far side from the lens. Accordingly, since the condition with the high peak power density is held in the area near the inside of the material with respect to the focal position, energy of the laser beam can be efficiently absorbed by the material. As a result, cutting with a higher speed than the speed with the conventional condensing lens can be attained. Also, an enter length of the energy to the inside of the material can be adjusted by adjusting the asymmetric property of the peak power density. The entering of unnecessary energy to the inside of the material can be suppressed. Accordingly, a problem such as chipping, taper, or dulling is reliably prevented at the laser exit side. The material surface can be processed with high precision.

A laser processing apparatus irradiates a material with a laser beam to process the material by using the condensing optical system according to claim 1. The apparatus is configured as follows.

An $M^2$ value which indicates a light condensing property of the laser beam is $M^2 < 2$, and the wavelength $\lambda$ of the laser beam is 100 nm $< \lambda <$ 20000 nm.

Also, change in peak power density of the laser beam in an optical-axis direction is asymmetric about a focal position of the laser beam through the condensing optical system (claim 12).

With the laser processing apparatus of the present invention, similarly to the above-described laser processing method, cutting with a higher speed than the speed with the conventional condensing lens can be attained, for example, when cutting is performed. Also, an enter length of the energy to the inside of the material can be adjusted by adjusting the asymmetric property of the peak power density. The entering of unnecessary energy to the inside of the material can be suppressed. Accordingly, a problem such as chipping, taper, or dulling is reliably prevented at the laser exit side. The material surface can be processed with high precision.

A manufacturing method of a brittle material blank according to the present invention includes irradiating a brittle material with a laser beam by using the condensing optical system according to claim 1, and processing the material. The method is configured as follows.

An $M^2$ value which indicates a light condensing property of the laser beam is $M^2<2$, and the wavelength $\lambda$ of the laser beam is $100$ nm$<\lambda<20000$ nm.

Also, change in peak power density of the laser beam in an optical-axis direction is asymmetric about a focal position of the laser beam through the condensing optical system (claim 13).

With the manufacturing method of the brittle material of the present invention, similarly to the above-described laser processing method, cutting with a higher speed than the speed with the conventional condensing lens can be attained, for example, when cutting is performed. Also, an enter length of the energy to the inside of the brittle material can be adjusted by adjusting the asymmetric property of the peak power density. The entering of unnecessary energy to the inside of the material can be suppressed. Accordingly, a problem such as chipping, taper, or dulling is reliably prevented at the laser exit side. The material surface can be processed with high precision.

The brittle material may be single crystal diamond, polycrystalline diamond, sintered cubic boron nitride, compound sintered compact or cemented carbide, the compound sintered compact including a layer of cubic boron nitride and a layer of the cemented carbide.

BEST MODE FOR CARRYING OUT THE INVENTION

[Condensing Optical System]

Figure 1:
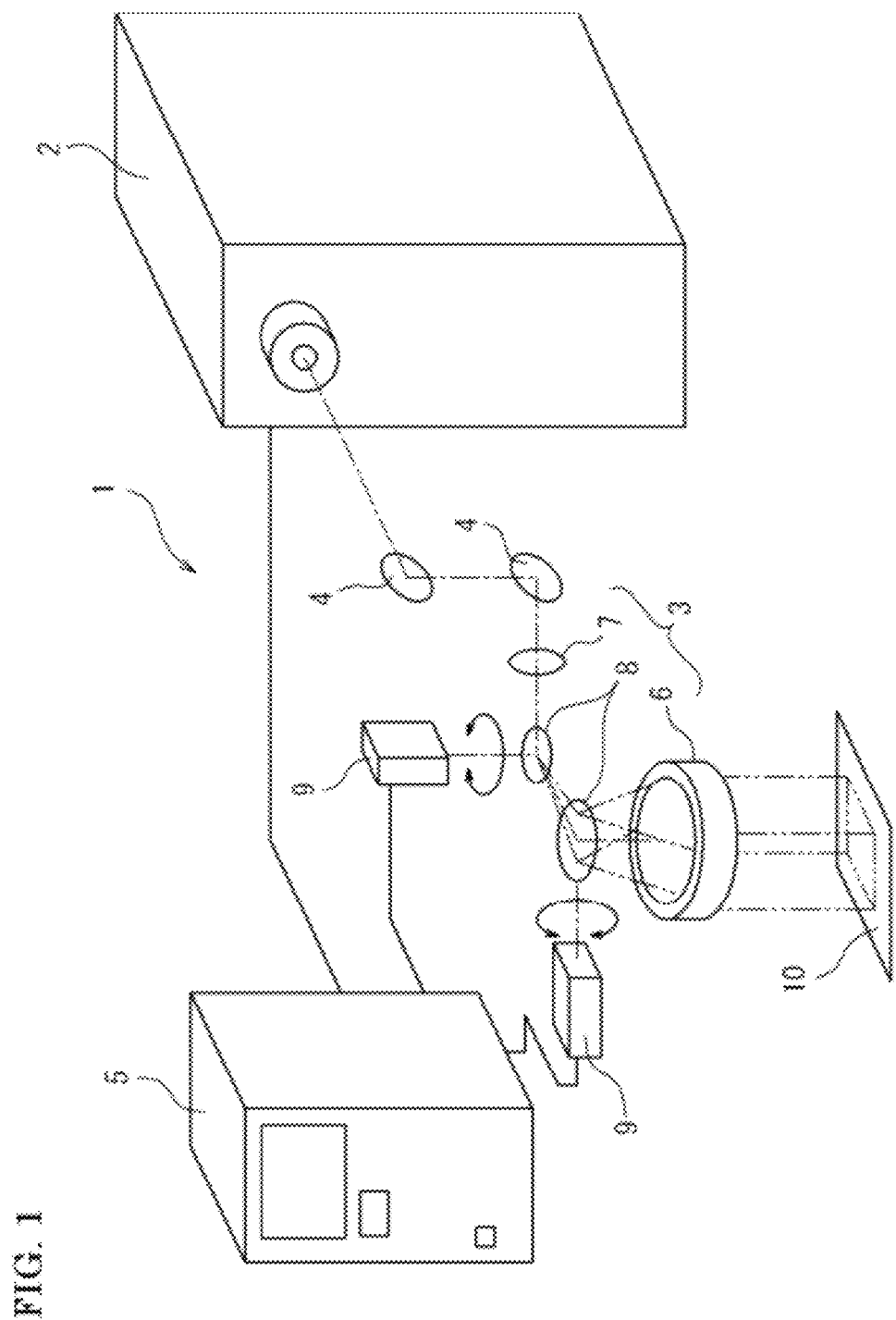
FIG. 1 is a schematic illustration showing a laser processing apparatus including a condensing optical system according to an embodiment of the present invention.
Figure 2:
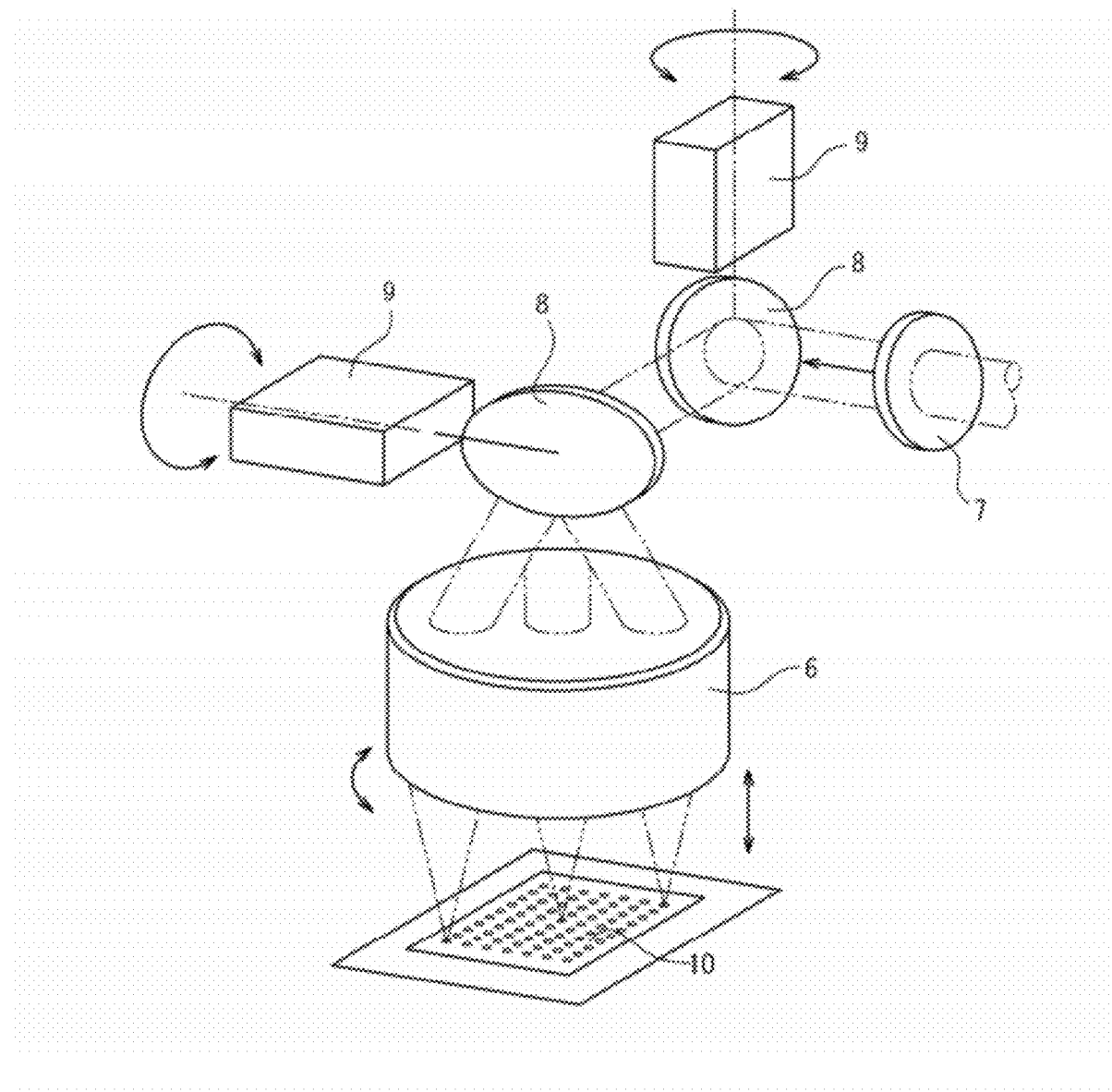
FIG. 2 is a schematic illustration showing a primary portion of FIG. 1.
Figure 3:
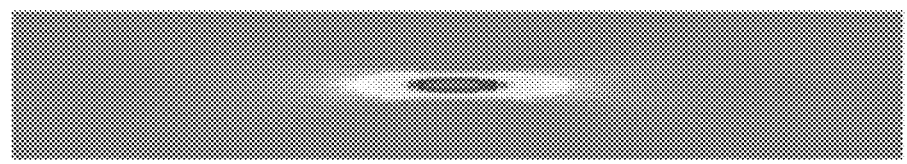
FIG. 3 shows an intensity distribution of a prototype 1 in an area near a focal position.
Figure 3:
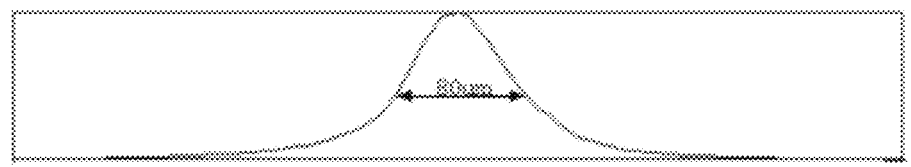
Figure 4:
FIG. 4 shows an intensity distribution of a prototype 2 in an area near a focal position.
Figure 4:
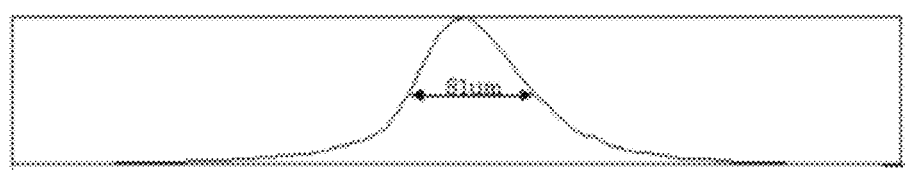
Figure 5:
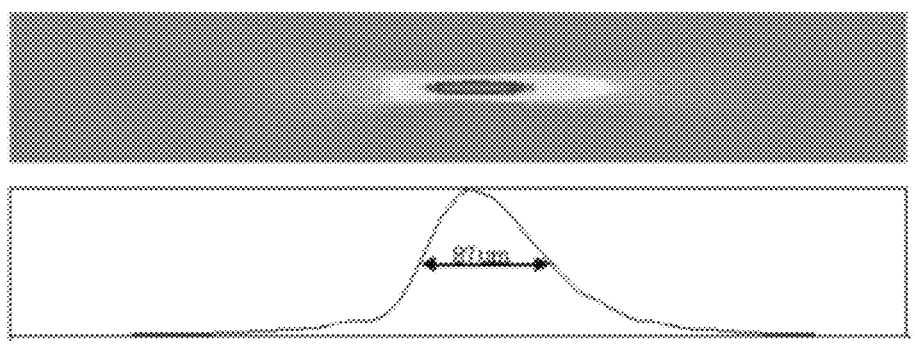
FIG. 5 shows an intensity distribution of a prototype 3 in an area near a focal position.
Figure 6:
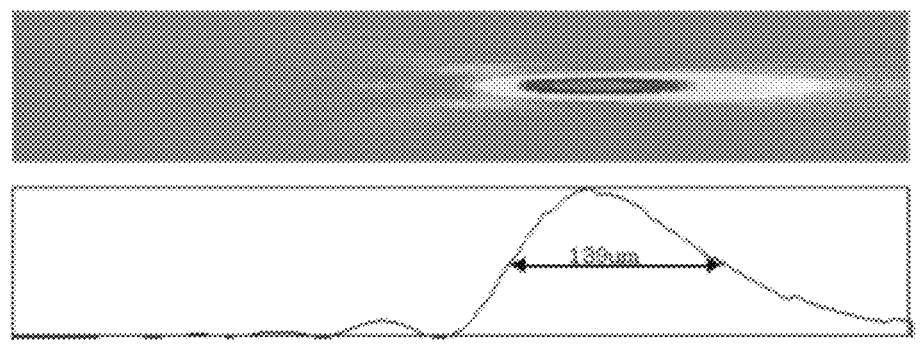
FIG. 6 shows an intensity distribution of a prototype 4 in an area near a focal position.
Figure 7:
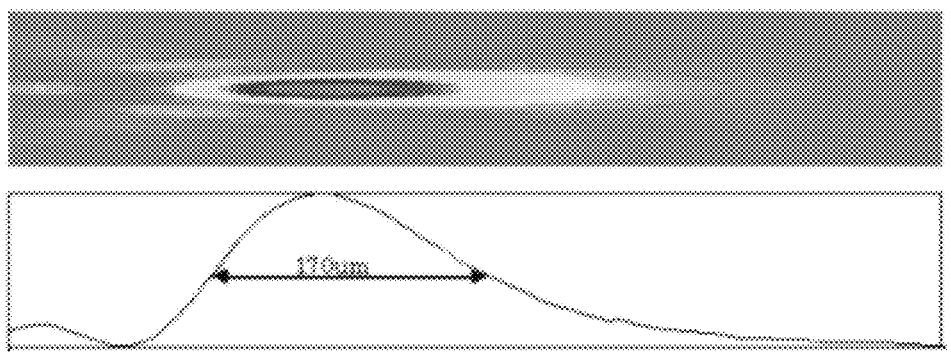
FIG. 7 shows an intensity distribution of a prototype 5 in an area near a focal position.
Figure 8:
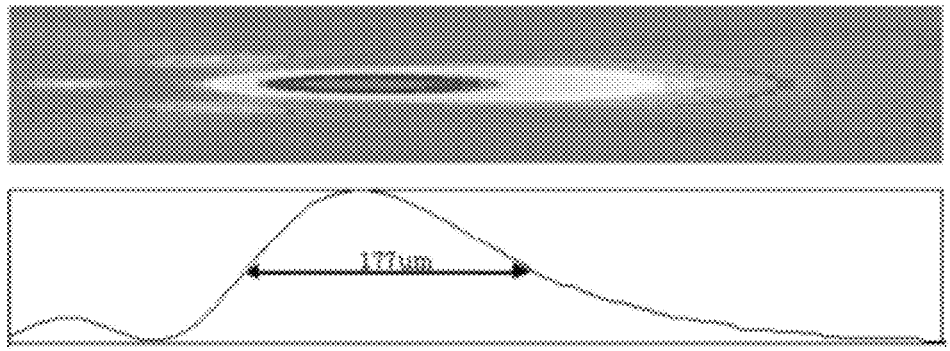
FIG. 8 shows an intensity distribution of a prototype 6 in an area near a focal position.
Figure 9:
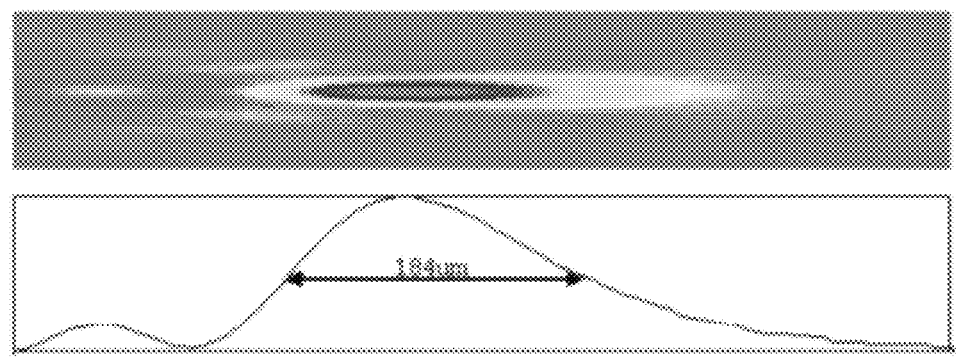
FIG. 9 shows an intensity distribution of a prototype 7 in an area near a focal position.
Figure 10:
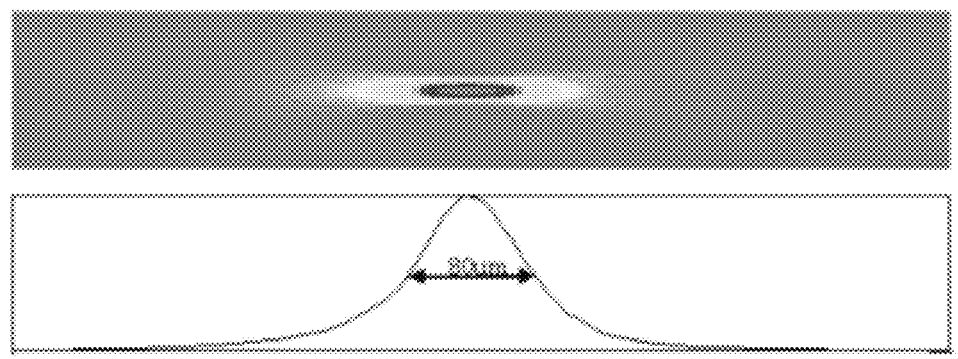
FIG. 10 shows an intensity distribution of a prototype 8 in an area near a focal position.
Figure 11:
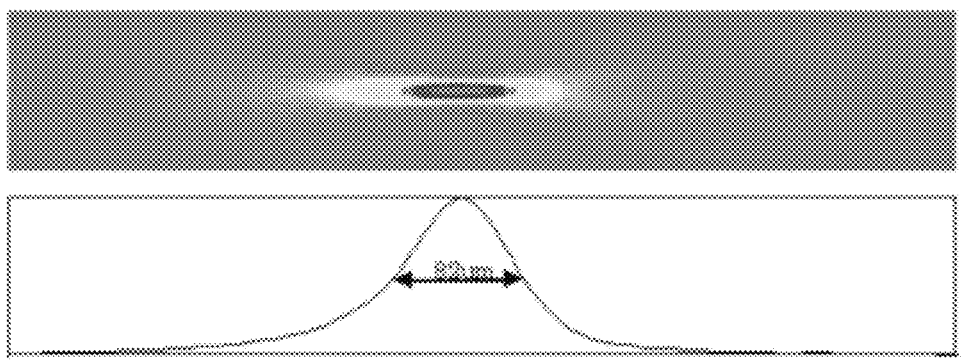
FIG. 11 shows an intensity distribution of a prototype 9 in an area near a focal position.
Figure 12:
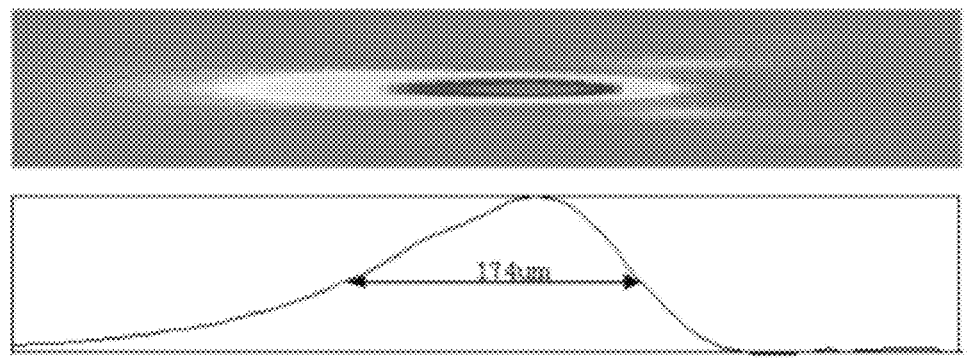
FIG. 12 shows an intensity distribution of a prototype 10 in an area near a focal position.
Figure 13:
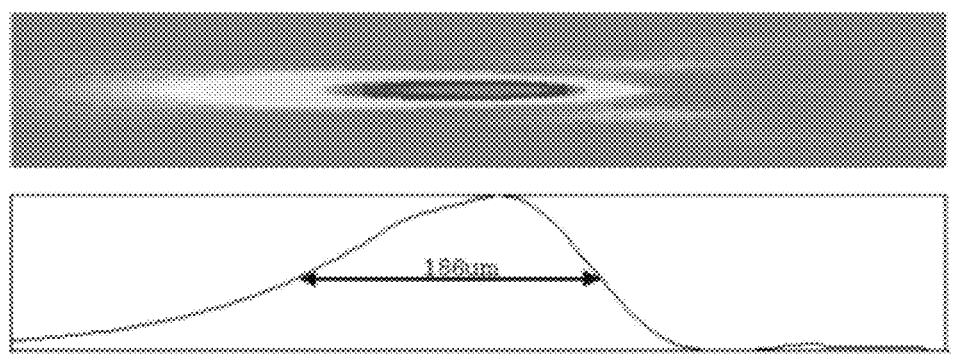
FIG. 13 shows an intensity distribution of a prototype 11 in an area near a focal position.
Figure 14:
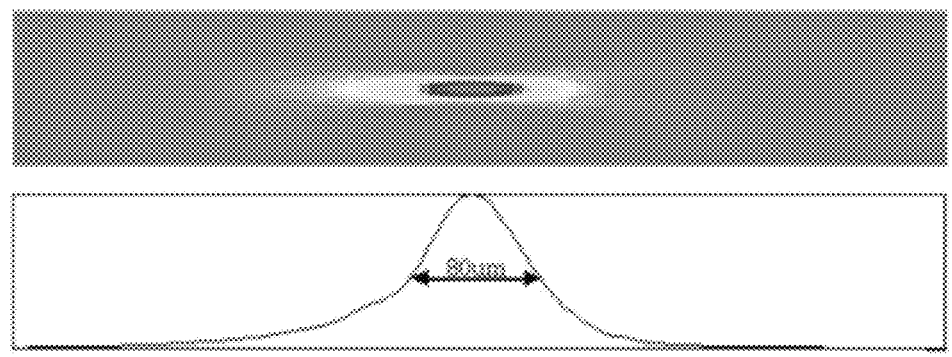
FIG. 14 shows an intensity distribution of a prototype 12 in an area near a focal position.
Figure 15:
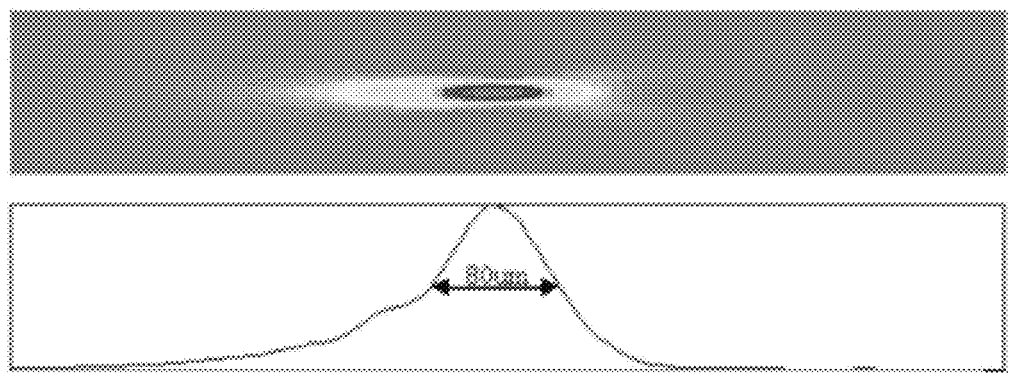
FIG. 15 shows an intensity distribution of a prototype 13 in an area near a focal position.
Figure 16:
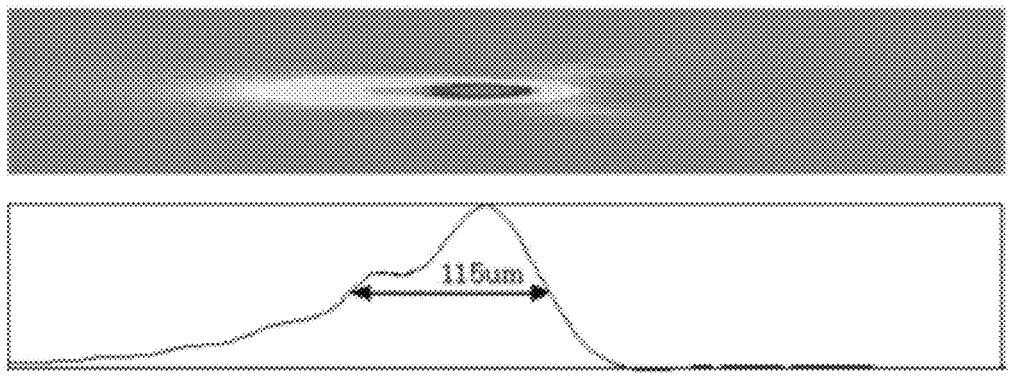
FIG. 16 shows an intensity distribution of a prototype 14 in an area near a focal position.
Figure 17:
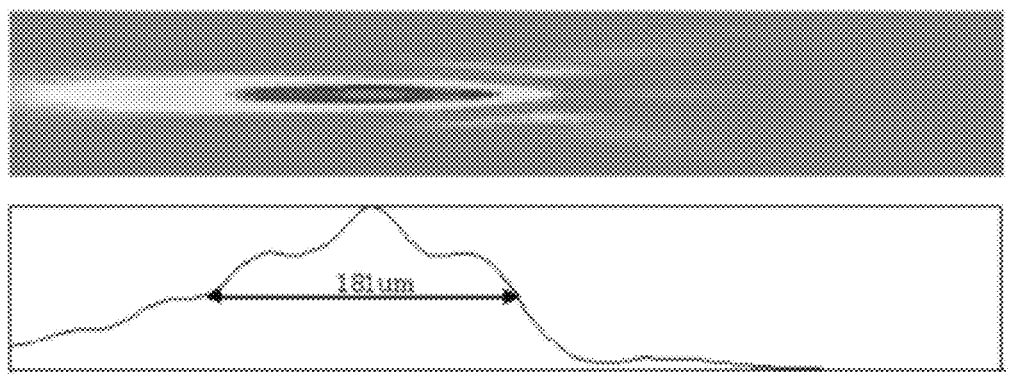
FIG. 17 shows an intensity distribution of a prototype 15 in an area near a focal position.
Figure 18:
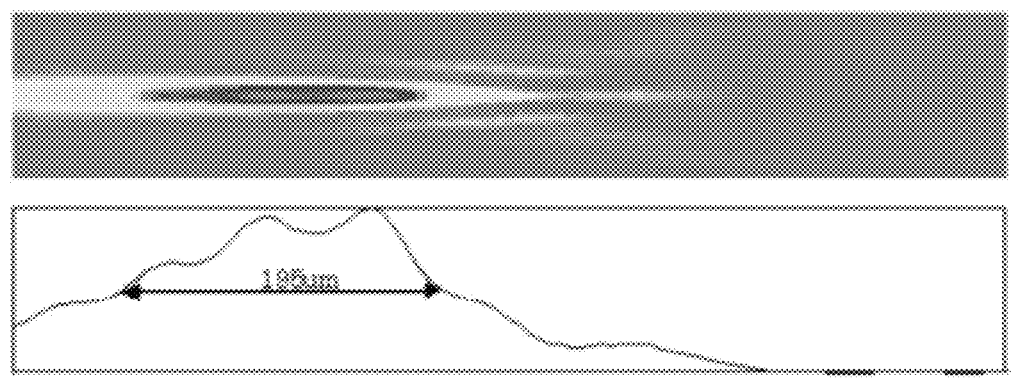
FIG. 18 shows an intensity distribution of a prototype 16 in an area near a focal position.
Figure 19:
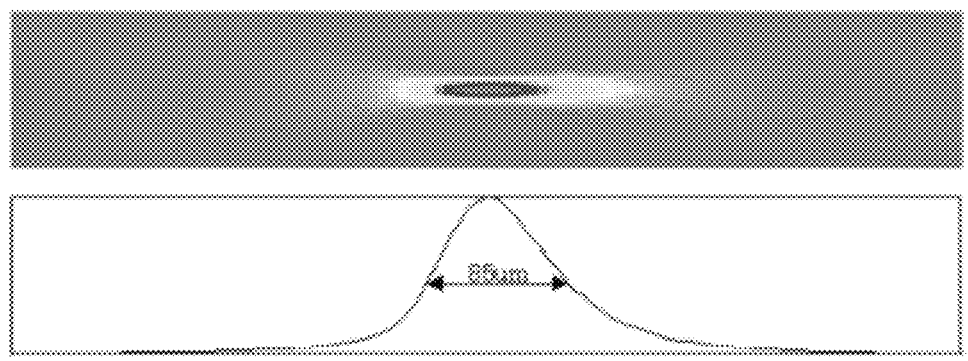
FIG. 19 shows an intensity distribution of a prototype 17 in an area near a focal position.
Figure 20:
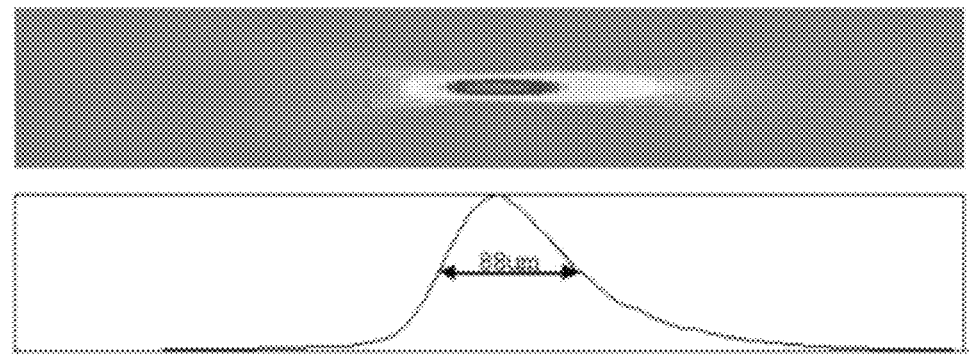
FIG. 20 shows an intensity distribution of a prototype 18 in an area near a focal position.
Figure 21:
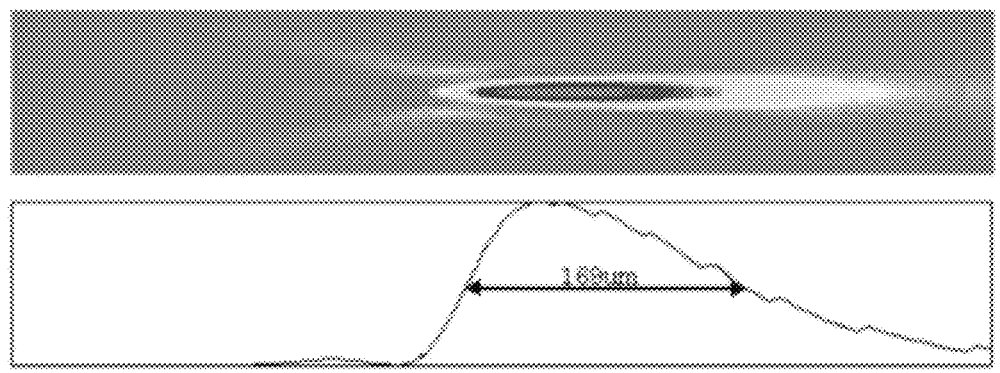
FIG. 21 shows an intensity distribution of a prototype 19 in an area near a focal position.
Figure 22:
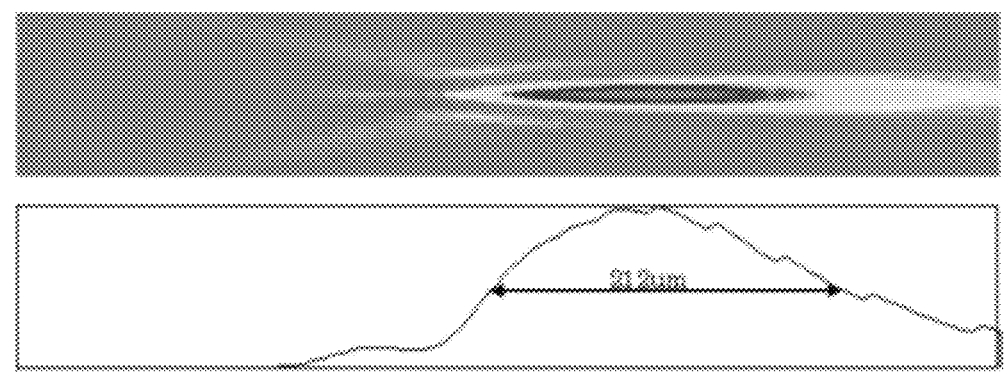
FIG. 22 shows an intensity distribution of a prototype 20 in an area near a focal position.
Figure 23:
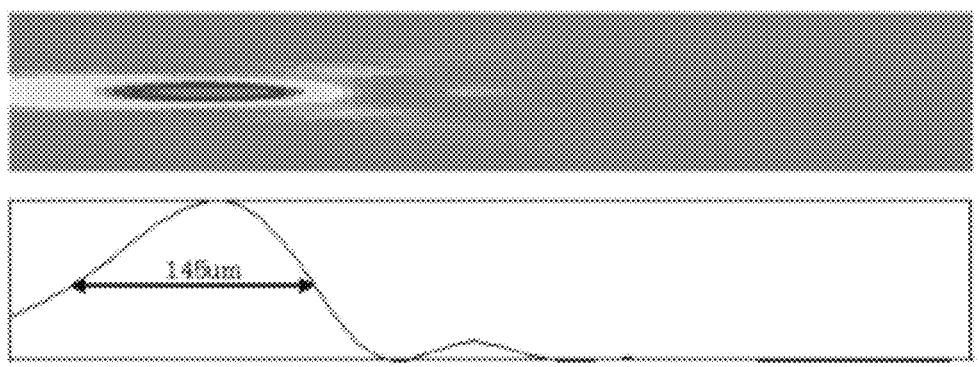
FIG. 23 shows an intensity distribution of a prototype 21 in an area near a focal position.
Figure 24:
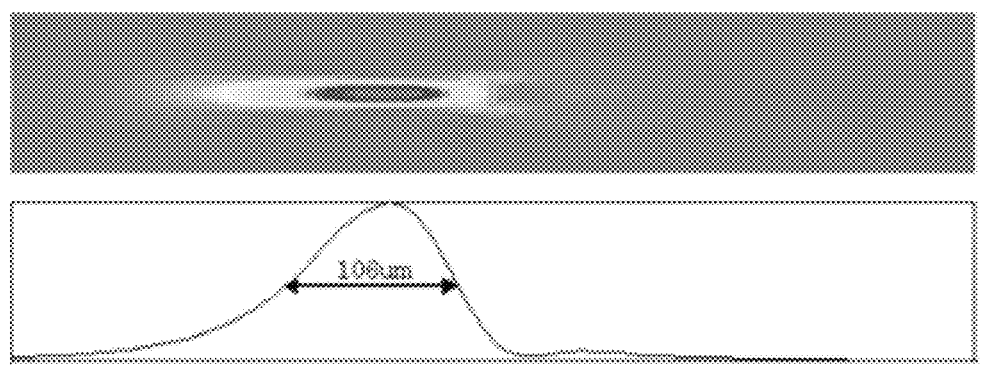
FIG. 24 shows an intensity distribution of a prototype 22 in an area near a focal position.
Figure 25:
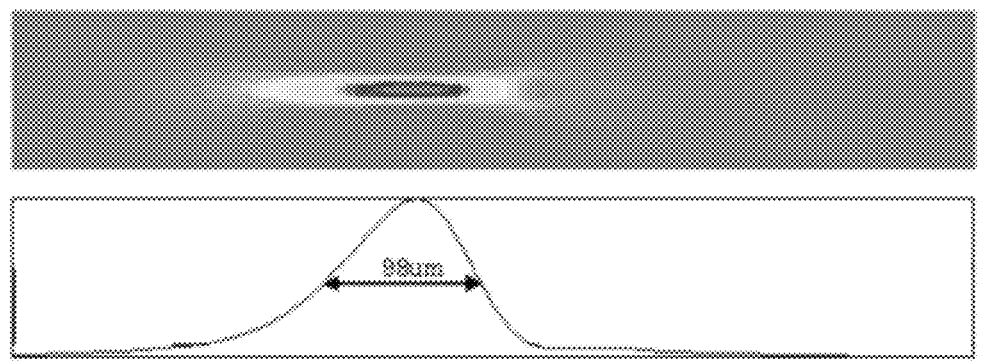
FIG. 25 shows an intensity distribution of a prototype 23 in an area near a focal position.
Figure 26:
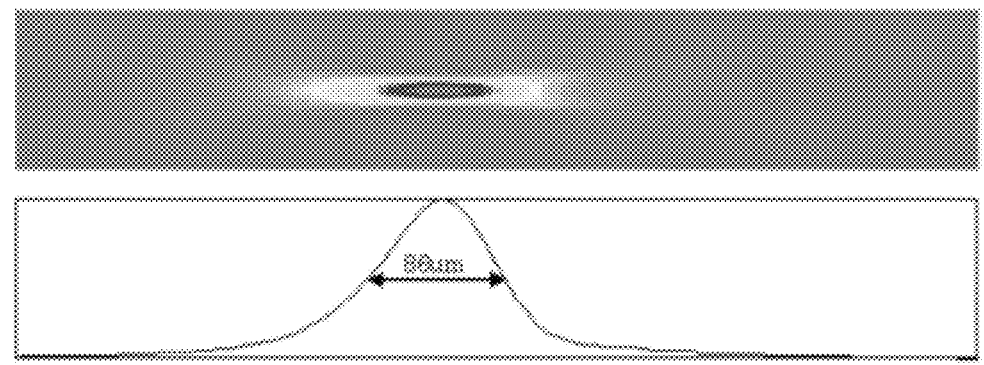
FIG. 26 shows an intensity distribution of a prototype 24 in an area near a focal position.
Figure 27:
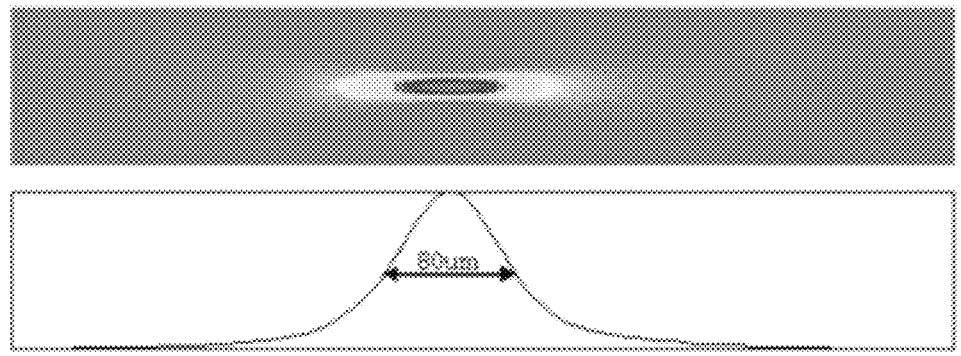
FIG. 27 shows an intensity distribution of a prototype 25 in an area near a focal position.
Figure 28:
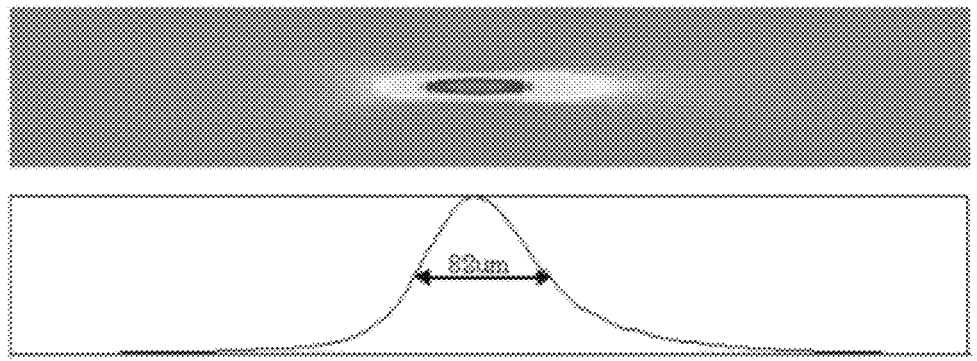
FIG. 28 shows an intensity distribution of a prototype 26 in an area near a focal position.
Figure 29:
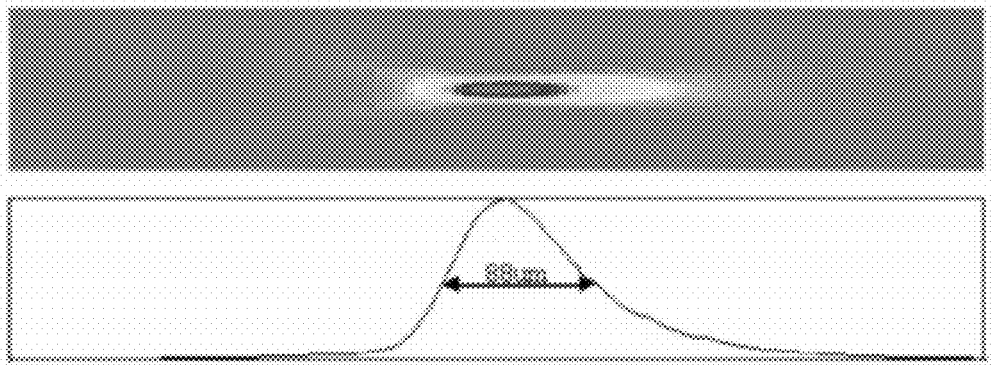
FIG. 29 shows an intensity distribution of a prototype 27 in an area near a focal position.
Figure 30:
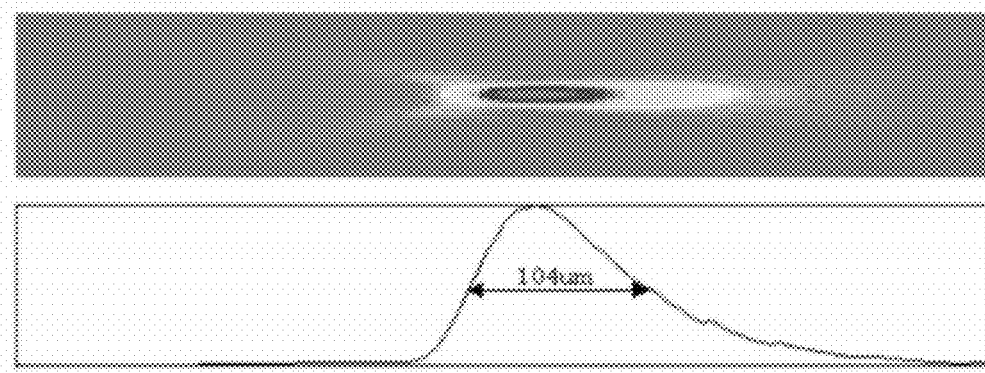
FIG. 30 shows an intensity distribution of a prototype 28 in an area near a focal position.
Figure 31:
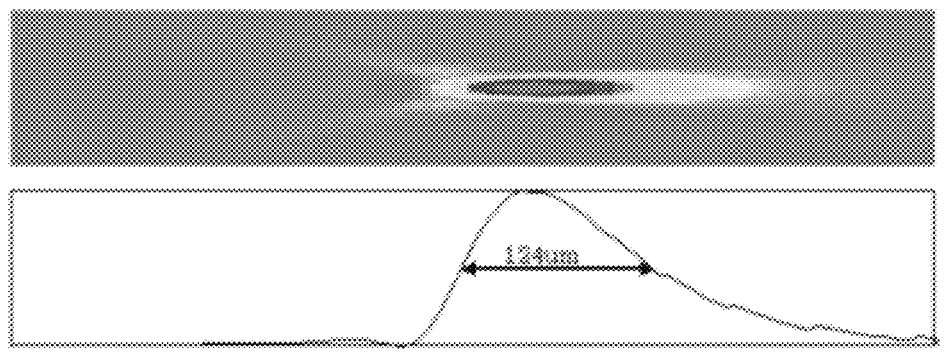
FIG. 31 shows an intensity distribution of a prototype 29 in an area near a focal position.
Figure 32:
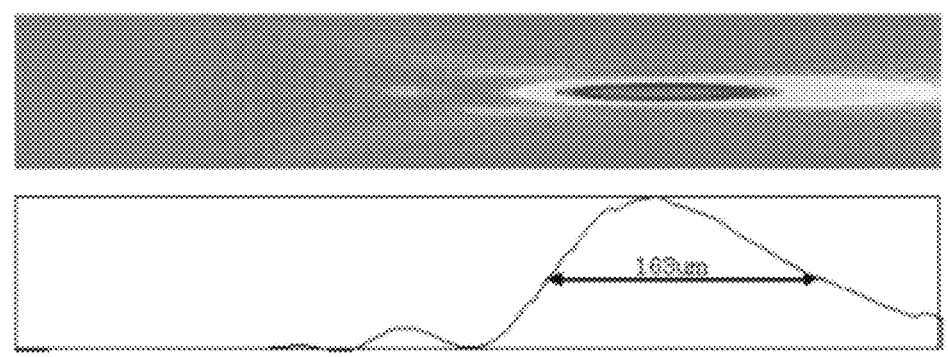
FIG. 32 shows an intensity distribution of a prototype 30 in an area near a focal position.
Figure 33:
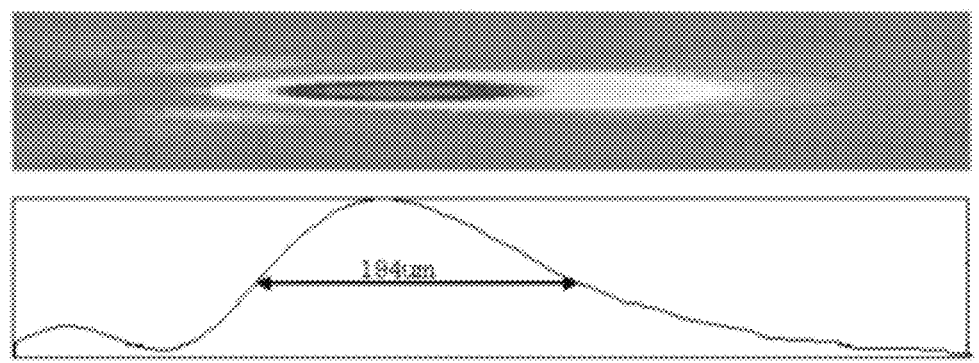
FIG. 33 shows an intensity distribution of a prototype 31 in an area near a focal position.

A condensing optical system according to an embodiment of the present invention is described below. FIGS. 1 and 2 are schematic illustrations showing a laser processing apparatus including a condensing optical system according to an embodiment of the present invention. A laser processing apparatus 1 includes a laser oscillator 2 that generates a laser beam, a condensing optical system 3 provided between the laser oscillator 2 and a workpiece, a transmitting optical system composed of two bent mirrors 4 that transmit the laser beam emitted from the laser oscillator 2, and a control device 5 that controls the laser oscillator 2 and the like. The condensing optical system 3, which is a compound optical system, includes first optical means 6 having a light condensing function, second optical means 7 having a spherical aberration producing function, a pair of galvanometer mirrors 8 serving as laser beam deflecting means, and a galvanometer scanner 9 that drives the galvanometer mirrors 8.

A workpiece is a printed board 10. A plurality of holes are made in a surface of the printed board 10 by laser irradiation. A laser beam generated by the laser oscillator 2 is, for example, a carbon dioxide laser or a YAG laser. The pair of galvanometer mirrors 8 and the galvanometer scanner 9 deflect the laser beam emitted from the laser oscillator 2 at a predetermined deflection angle, so as to deflect the laser beam in an X-axis direction and a Y-axis direction on the printed board 10.

The first optical means 6 having the light condensing function is an fθ lens 6 that condenses the laser beam deflected by the galvanometer mirrors 8 to a work position of the workpiece. The second optical means 7 having the aberration producing function is an aspherical phase plate 7 arranged between the bent mirrors 4 and the front galvanometer mirror 8. Alternatively, the second optical means 7 may be a diffractive phase plate. The fθ lens 6 serving as the first optical means is arranged between the rear galvanometer mirror 8 and the printed board 10, and hence employs an image-side telecentric system. By using the fθ lens 6, on-axis and off-axis laser beams deflected by the galvanometer mirrors 8 in various directions become substantially parallel to an optical axis. The light beams are perpendicularly incident on the surface of the printed board 10, and are focused on the surface. Accordingly, a plurality of holes, for example, which are discretely arranged, are made in the surface of the printed board 10.

Here, producing spherical aberration was studied in order to obtain a large focal depth with a small spot size without a decrease in intensity of the spot. In particular, a 15th coefficient of coefficients of the Zernike fringe polynomial of wavefront aberration corresponding to a 5th order spherical aberration and an 8th coefficient of the coefficients of the Zernike fringe polynomial of wavefront aberration corresponding to a 3rd spherical aberration were noticed, and aspherical lenses were designed as prototypes. Then, a focal depth and an intensity of each of the designed prototypes were measured using an intensity distribution in front and rear areas of a focal position when a laser beam passes through the prototype. Irradiation conditions with a laser beam includes a focal length of 50 mm, an entrance pupil diameter of φ20 mm, a wavelength of an incident laser beam of 1.064 μm, and a laser beam diameter of φ10 mm (diameter corresponding to intensity of $1/e^2$). The intensity distribution was measured while a cross-sectional intensity measurement apparatus is moved in an optical-axis direction. Table I is a prototype condition, a focal depth, an intensity, and their evaluations for each of the prototypes (1 to 31). FIGS. 3 to 33 each represent an intensity distribution in front and rear areas of a focal position of each of the prototypes, by a gradation plane image (upper section) and a height (lower section). Reference character λ denotes a wavelength, $Z_8$ is the 8th coefficient of the coefficients of the Zernike fringe polynomial of wavefront aberration, and $Z_{15}$ is the 15th coefficient of the coefficients of the Zernike fringe polynomial of wavefront aberration. The coefficients of the Zernike fringe polynomial other than the above-mentioned coefficients are 0.

TABLE I

| | $Z_8$ | $Z_{15}$ | $Z_8/Z_{15}$ | Intensity | Intensity evaluation | Focal depth | Focal depth evaluation | Applied expression | | | |
|---|---|---|---|---|---|---|---|---|---|---|---|
| Prototype 1 | 0 | 0 | — | 1.00 | Reference value | 80 | X | — | | | |
| Prototype 2 | 0.05λ | 0 | ∞ | 0.99 | ○ | 81 | X | — | | | |
| Prototype 3 | 0.10λ | 0 | ∞ | 0.97 | ○ | 87 | ○ | a, | | b, c, d | |
| Prototype 4 | 0.50λ | 0 | ∞ | 0.71 | ○ | 139 | ○ | a, | | b, c, d | |
| Prototype 5 | 1.00λ | 0 | ∞ | 0.53 | ○ | 170 | ○ | a, | | b, c, d | |
| Prototype 6 | 1.10λ | 0 | ∞ | 0.50 | ○ | 177 | ○ | a, | | b, c, d | |
| Prototype 7 | 1.20λ | 0 | ∞ | 0.48 | △ | 184 | ○ | a, | | b, c, d | |
| Prototype 8 | −0.05λ | 0 | ∞ | 1.00 | ○ | 80 | X | — | | | |
| Prototype 9 | −0.10λ | 0 | ∞ | 0.99 | ○ | 82 | ○ | a, | | b, c, d | |
| Prototype 10 | −1.30λ | 0 | ∞ | 0.50 | ○ | 174 | ○ | a, | | b, c, d | |
| Prototype 11 | −1.40λ | 0 | ∞ | 0.47 | △ | 186 | ○ | a, | | b, d | |
| Prototype 12 | 0 | 0.05λ | 0 | 0.99 | ○ | 80 | ○ | | a, | b, c, d | |
| Prototype 13 | 0 | 0.10λ | 0 | 0.96 | ○ | 80 | ○ | | a, | b, c, d | |
| Prototype 14 | 0 | 0.20λ | 0 | 0.81 | ○ | 115 | ○ | | a, | b, c, d | |
| Prototype 15 | 0 | 0.40λ | 0 | 0.52 | ○ | 181 | ○ | | a, | b, c, d | |
| Prototype 16 | 0 | 0.50λ | 0 | 0.43 | △ | 195 | ○ | | a, | b, c | |
| Prototype 17 | 0 | −0.05λ | 0 | 0.98 | ○ | 85 | ○ | | a, | b, c, d | |
| Prototype 18 | 0 | −0.10λ | 0 | 0.93 | ○ | 88 | ○ | | a, | b, c, d | |
| Prototype 19 | 0 | −0.30λ | 0 | 0.58 | ○ | 169 | ○ | | a, | b, c, d | |
| Prototype 20 | 0 | −0.40λ | 0 | 0.48 | △ | 212 | ○ | | a, | b, c, d | |
| Prototype 21 | −1.00λ | −0.10λ | 10 | 0.62 | ○ | 145 | ○ | a, | a, | b, c, d | |
| Prototype 22 | −0.50λ | −0.10λ | 5 | 0.84 | ○ | 106 | ○ | a, | a, | b, c, d | |
| Prototype 23 | −0.40λ | −0.10λ | 4 | 0.91 | ○ | 98 | ○ | a, | a, | b, c, d | |
| Prototype 24 | −0.30λ | −0.10λ | 3 | 0.96 | ○ | 86 | ○ | a, | a, | b, c, d | |
| Prototype 25 | −0.20λ | −0.10λ | 2 | 0.98 | ○ | 80 | X | — | | | |
| Prototype 26 | −0.10λ | −0.10λ | 1 | 0.98 | ○ | 82 | X | — | | | |
| Prototype 27 | 0 | −0.10λ | 0 | 0.93 | ○ | 88 | ○ | | a, | b, c, d | |
| Prototype 28 | 0.10λ | −0.10λ | −1 | 0.85 | ○ | 104 | ○ | a, | a, | b, c, d | |

TABLE I-continued

|  | $Z_8$ | $Z_{15}$ | $Z_8/Z_{15}$ | Intensity | Intensity evaluation | Focal depth | Focal depth evaluation | Applied expression |
|---|---|---|---|---|---|---|---|---|
| Prototype 29 | 0.20λ | −0.10λ | −2 | 0.76 | ○ | 124 | ○ | a, a, b, c, d |
| Prototype 30 | 0.50λ | −0.10λ | −5 | 0.60 | ○ | 163 | ○ | a, a, b, c, d |
| Prototype 31 | 1.00λ | −0.10λ | −10 | 0.46 | △ | 194 | ○ | a, a, b, c, d |

In the prototype 1, $Z_8$ and $Z_{15}$ are both 0 to obtain a very small spot size. The prototype 1 is designed to produce no aberration, and hence has a small focal depth. The intensities in Table I are relative values with reference to the prototype 1 serving as a reference value. The intensities each were evaluated as fair (indicated by white triangle) when the relative value with reference to the prototype 1 is smaller than 0.5, or good (indicated by white circle) when the relative value is 0.5 or larger. The focal depth was obtained by a distance in the optical-axis direction at a half level of the peak intensity (full width at half maximum). The focal depth was basically evaluated as good (indicated by white circle) when the focal depth exceeds 80 μm, which is the value of the prototype 1, or bad (indicated by x) when the focal depth is 80 μm which is the same value as that of the prototype 1. Regarding the prototypes 2, 12, 13, and 26, the evaluation of good or bad was made according to a determination factor which is different from the above condition because of the following reasons.

(Effect of $Z_8$: Prototypes 2 to 11)

The prototypes 2 to 11 were fixed such that $Z_{15}=0$, $Z_8/Z_{15}=\infty$. $Z_8$ was gradually increased from 0.05λ to 1.20λ, and then gradually decreased from −0.05λ to −1.40λ.

For the focal depth, the focal depth is as small as 81 μm when $Z_8$ is 0.05λ (although the value exceeds 80 μm, the focal depth of the prototype 2 was evaluated as bad because there is no significant difference), and is as large as 87 μm when $Z_8$ is 0.10λ. It is recognized that the focal depth is further increased as $Z_8$ is further increased. The focal depth is as small as 80 μm when $Z_8$ is −0.05λ, and is as large as 82 μm when $Z_8$ is −0.10λ. It is recognized that the focal depth is further increased as $Z_8$ is further decreased.

For the intensity, it is recognized that the intensity is gradually decreased as $Z_8$ is increased; however, the intensity of 0.48 is held when $Z_8$ is 1.20λ. When $Z_8$ becomes a negative value, it is recognized that the intensity is gradually decreased as $Z_8$ is decreased; however, the intensity of 0.47 is held when $Z_8$ is −1.4λ.

Regarding $Z_8$, satisfying a relational expression of $|Z_8| \geq 0.1\lambda$, is a condition of obtaining the large focal depth, and satisfying a relational expression of $|Z_8| < 1.4\lambda$ is a condition of holding the intensity.

(Effect of $Z_{15}$: Prototypes 12 to 20)

The prototypes 12 to 20 were fixed such that $Z_8=0$, $Z_8/Z_{15}=0$. $Z_{15}$ was gradually increased from 0.05λ to 0.50λ, and then gradually decreased from −0.05λ to −0.40λ.

For the focal depth, the focal depth is as small as 80 μm when values of $Z_{15}$ are 0.05λ and 0.10λ, and is as large as 115 μm when $Z_{15}$ is 0.20λ. It is recognized that the focal depth is further increased as $Z_{15}$ is further increased. The focal depth is as large as 85 μm when $Z_{15}$ is −0.05λ. It is recognized that the focal depth is further increased as $Z_{15}$ is further decreased. When $Z_{15}=0.05\lambda$ (prototype 12), and $Z_{15}=0.10\lambda$ (prototype 13), a full width at half maximum is 80 μm. Since it is recognized that the focal depth is increased at an intensity level lower than the half maximum, the focal depth is determined as good.

For the intensity, it is recognized that the intensity is gradually decreased as $Z_{15}$ is increased; however, the intensity of 0.43 is held when $Z_{15}$ is 0.50λ. When $Z_{15}$ becomes a negative value, it is recognized that the intensity is gradually decreased as $Z_{15}$ is decreased; however, the intensity of 0.48 is held when $Z_{15}$ is −0.40λ.

Regarding $Z_{15}$, satisfying a relational expression of $|Z_{15}| \geq 0.05\lambda$ is a condition of obtaining the large focal depth, and satisfying a relational expression of $|Z_{15}| < 0.5\lambda$ is a condition of holding the intensity.

(Effect of $Z_8/Z_{15}$: Prototypes 21 to 31)

The prototypes 21 to 31 were fixed at −0.10λ satisfying $|Z_{15}| \geq 0.05\lambda$, $|Z_{15}| < 0.5\lambda$, which are the above-derived conditions of $Z_{15}$. Further, presupposing that $|Z_8| \geq 0.1\lambda$, $|Z_8| < 1.4\lambda$ are satisfied, which are the above-derived conditions of $Z_8$, $Z_8$ is changed from −1.00λ to 0, and then from 0 to 1.00λ, so that $Z_8/Z_{15}$ is changed within ranges of from 10 to 0, and from 0 to −10.

For the focal depth, the focal depth is as large as 145 μm when $Z_8/Z_{15}$ is 10. It is recognized that the focal depth is decreased as $Z_8/Z_{15}$ is decreased. When values of $Z_8/Z_{15}$ is 2 and 1, the respective focal depths are as small as 80 μm and 82 μm (although the latter value exceeds 80 μm, the focal depth of the prototype 26 was evaluated as bad because there is no significant difference). When $Z_8/Z_{15}$ becomes 0, the focal depth is as large as 88 μm. It is recognized that the focal depth is gradually increased as $Z_8/Z_{15}$ is further increased from this value.

For the intensity, the intensity is 0.62 when $Z_8/Z_{15}$ is 10. It is recognized that the intensity is gradually increased as $Z_8/Z_{15}$ is decreased from 10 to 1, and that the intensity is gradually decreased as $Z_8/Z_{15}$ is decreased from 0 to a negative value. The intensity of 0.46 is held when $Z_8/Z_{15}$ is −10.

Regarding $Z_8/Z_{15}$, satisfying a relational expression of $Z_8/Z_{15} \geq 3$ or $Z_8/Z_{15} < 1$ is a condition of obtaining the large focal length. For the intensity, the above-described expression of $|Z_{15}| < 0.5\lambda$ or $|Z_8| < 1.4\lambda$ may be satisfied.

CONCLUSION

An aspherical lens may be designed such that Expressions (a) and (b) are satisfied to provide a large focal length with a small spot size by the aspherical lens, and Expressions (c) and (d) are satisfied in addition to Expressions (a) and (b) to avoid the intensity of the spot from being decreased, as follows:

$$|Z_8| \geq 0.1\lambda \text{ or } |Z_{15}| \geq 0.05\lambda, \tag{a}$$

$$Z_8/Z_{15} \geq 3 \text{ or } Z_8/Z_{15} < 1, \tag{b}$$

$$|Z_8| < 1.4\lambda, \text{ and} \tag{c}$$

$$|Z_{15}| < 0.5\lambda. \tag{d}$$

Here, a difference between this condensing optical system and the conventional condensing optical system is described. Since the conventional aspherical lens or compound lens (lens set) is designed to produce no aberration ($Z_8=0$, $Z_{15}=0$, etc.), it is different from an aspherical lens satisfying Expressions and producing spherical aberration.

Figure 34:
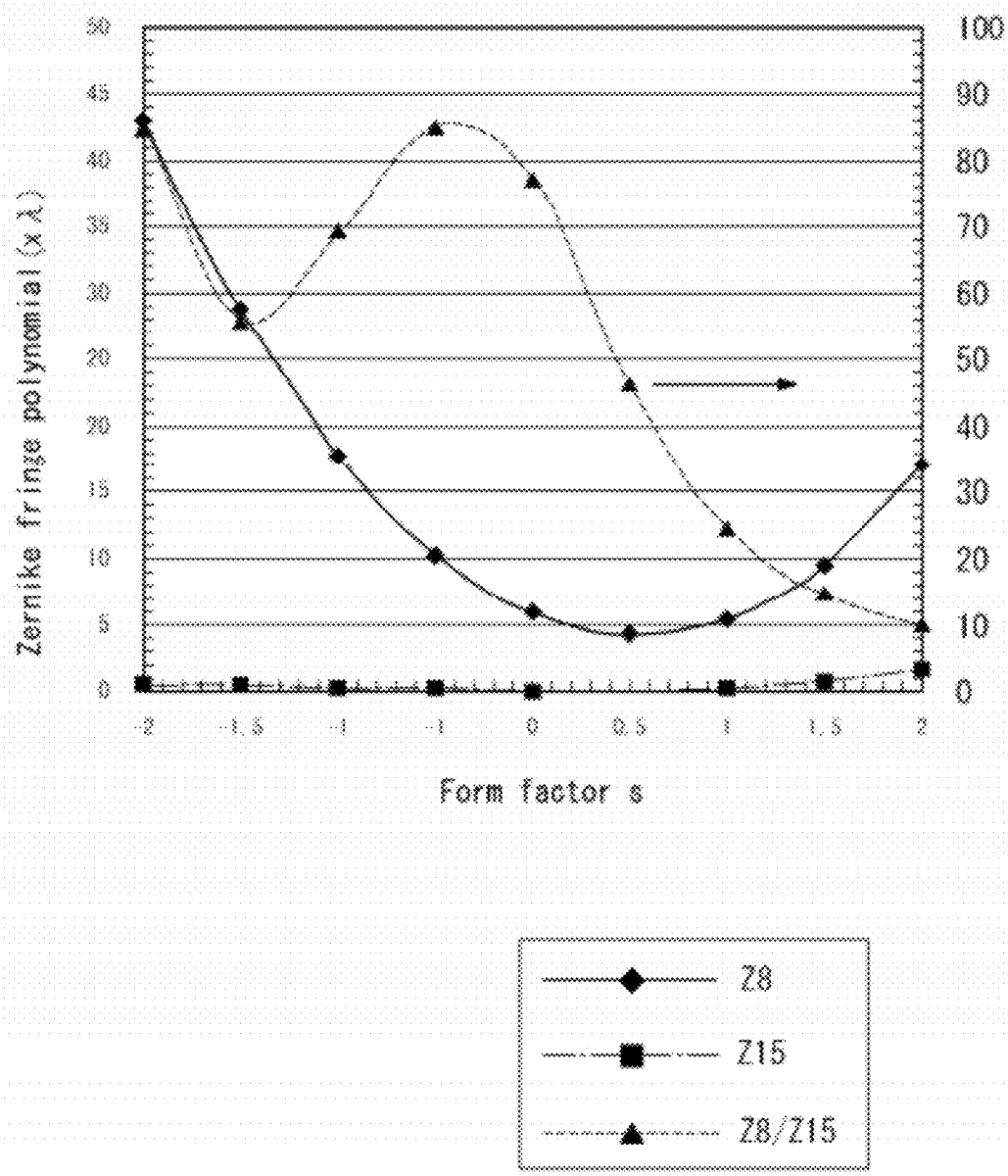
FIG. 34 is a graph relating to $Z_8$, $Z_{15}$, and $Z8/Z_{15}$ of a single spherical lens.

Meanwhile, when a single spherical lens is used, spherical aberration typically remains. Spherical lenses are classified into three kinds of a planoconvex lens, a biconvex lens, and a meniscus lens (for convex lenses) because of their different shapes of two surfaces of each lens. $Z_8$, $Z_{15}$, and $Z_8/Z_{15}$ of the spherical lenses are plotted, for example, as shown in a graph of FIG. 34.

A form factor S in the horizontal axis is obtained by (r1+r2)/(r1−r2) using curvature radii r1 and r2 of first and second surfaces of a lens (radius being a negative value when a surface is concave in a light advancing direction whereas radius being a positive value when a surface is convex in the light advancing direction). Even when a biconvex lens of S=0.5 (r1=−3r2) having the smallest spherical aberration is used, $Z_8>4\lambda$ is satisfied. Spherical aberration of the single spherical lens is noticeably large as compared with spherical aberration of an aspherical lens satisfying Expressions. Accordingly, it is clear that the single spherical lens is different from the aspherical lens.

The aspherical phase plate 7 having the aberration producing function of this embodiment is fabricated upon the design satisfying Expressions (a) to (d). Accordingly, the large focal depth with the small spot size without the decrease in intensity of the spot can be obtained.

When boring of the printed board 10 is performed with the laser processing apparatus 1 including the above-described condensing optical system, the laser beam generated by the laser oscillator 2 is radiated through a shutter of the laser oscillator 2, and an advancing direction of the laser beam is changed by the two bent mirrors 4 provided near the laser oscillator 2. The laser beam passes through the aspherical phase plate 7, is deflected by the two galvanometer mirrors 8, and is guided to the fθ lens 6. The laser beam emitted from the galvanometer mirrors 8 is converged by the fθ lens 6, and emitted on the printed board 10 in accordance with a focal length of the fθ lens 6. The galvanometer mirrors 8 deflect the advancing direction of the laser beam (or scan the laser beam). Hence, a laser beam incident position on the printed board 10 is changed, and a plurality of holes are made in the printed board 10.

With the above-described laser processing apparatus 1, since the aspherical phase plate 7 having the spherical aberration producing function in the condensing optical system 3 is designed to satisfy Expressions (a) to (d), and produces spherical aberration, the spherical aberration affects the focal depth. Thus, the large focal depth can be obtained while the spot size is held small. Unlike the conventional multifocal lens, the focal positions of laser beams are not discontinuously connected, or the Bessel beam does not have to be employed. Problems such as the decrease in intensity of the spot, the discontinuity of the intensity distribution in front and rear areas of the focal position, and the like, do not occur. The configuration is suitable for processing which requires high output, provides easy focusing, and is capable of processing of a material with a large thickness, or of deep processing. Further, the laser processing apparatus 1 is applicable to processing of a workpiece a work surface of which is displaced in the optical-axis direction due to warping or the like. Further, since the first optical means having the light condensing function is the fθ lens, the spot with the large focal depth can scan on a focal plane at a high speed.

The present invention is not limited to the above-described embodiment. For example, a condensing optical system producing the spherical aberration may be a single aspherical condensing lens or a single diffractive condensing lens. Alternatively, the condensing optical system may be a compound optical system like this embodiment, and then the first optical means having the light condensing function may be a condensing optical component such as a normal lens or an aspherical mirror. In the laser processing apparatus, a polygonal mirror may be used instead of the galvanometer mirror that deflects a laser beam. In the above-described embodiment, an application example of the boring of a printed board is described. In addition, the configuration is applicable to various purposes of laser processing such as cutting or welding of a metal or non-metal material. It is expected that a good processing property can be obtained by the effect of the increase in focal depth.

[Laser Processing Method and Apparatus, and Manufacturing Method of Brittle Material Blank]

Next, laser processing method (hereinafter, also merely referred to as processing method) and apparatus, and a manufacturing method of a brittle material blank (hereinafter, also merely referred to as manufacturing method) according to embodiments of the present invention are described.

In the processing method or the manufacturing method of the present invention, processing of a brittle material or manufacturing of a member made of the brittle material is performed using the laser beam through the above-described condensing optical system. An example brittle material may be single crystal diamond, sintered polycrystalline diamond, sintered cubic boron nitride, cemented carbide such as tungsten carbide, cermet such as titanium carbonitride, or ceramic such as silicon nitride. The laser may be a laser having an $M^2$ value, which is an index representing light condensing property, satisfying $M^2<2$, and a wavelength λ satisfying 100 nm<λ<20000 nm. The type of laser may be a YAG fundamental or harmonic laser, an excimer laser, a $CO_2$ laser, a semiconductor laser, or a short pulse laser such as a femtosecond laser or a picosecond laser.

The present invention has a feature of using a transmitting optical component configured such that, to condense a laser beam emitted from a laser oscillator, when the laser beam having a light intensity distribution of an ideal Gaussian form is incident, change in beam diameter or change in peak power density in an optical-axis direction becomes asymmetric about a focal position of the laser beam through a condensing optical system, and that a cross-sectional intensity distribution of the laser beam during propagation contains a part with a non-Gaussian form. Such a transmitting optical component may be any kind of transmitting optical components as long as a propagating characteristic of a peak power is asymmetric. For example, the transmitting optical component may be an aspherical lens having an aspherical surface, a diffractive lens, a refractive index profile lens, or an aspherical mirror. When the aspherical lens is used, a curvature radius, which is one of various specifications of the lens, is changed, thereby adjusting an asymmetric property of a propagating characteristic of a peak power. When the diffractive lens is used, a phase distribution is changed, thereby adjusting an asymmetric property of a propagating characteristic of a peak power.

Figure 35:
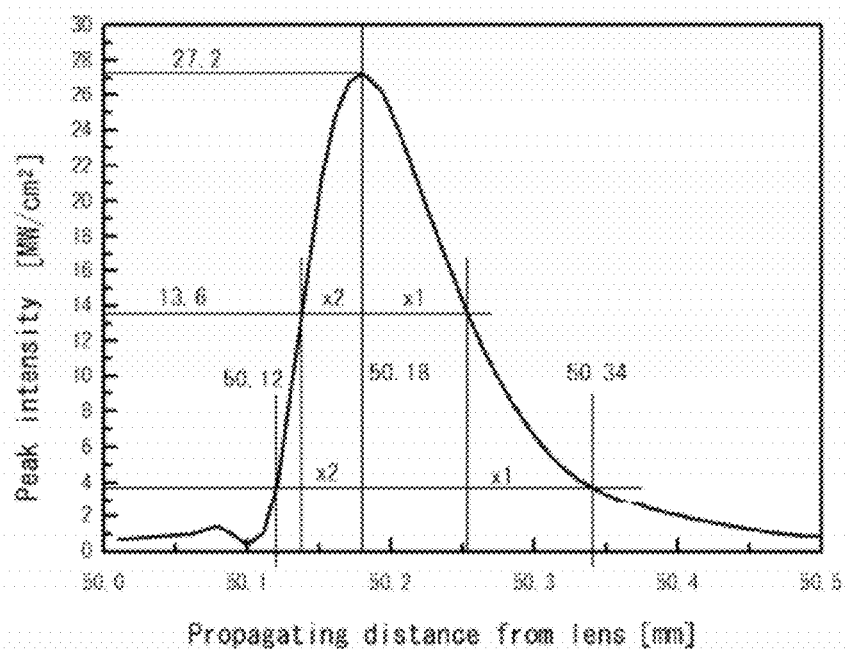
FIG. 35 is an illustration showing an example of change in peak power density applied to a laser beam by an aspherical lens.
Figure 36:
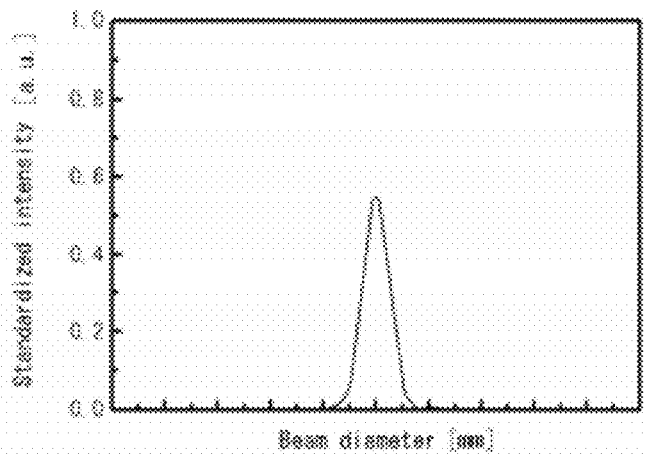
FIG. 36 is an illustration showing a cross-sectional intensity distribution of the laser beam having the change in peak power density shown in FIG. 35.
Figure 36:
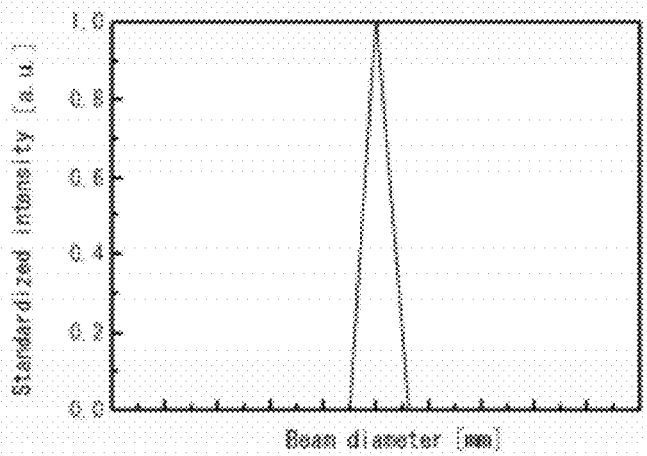
Figure 36:
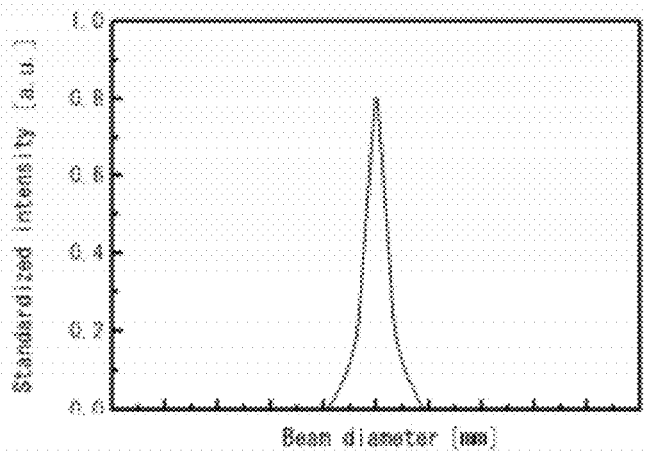

FIG. 35 is an illustration showing an example of change in peak power density applied to a laser beam by an aspherical lens. FIG. 36 is an illustration showing a cross-sectional intensity distribution of the laser beam having the change in peak power density shown in FIG. 35. In FIG. 35, the horizontal axis plots a propagating distance from the lens, and the vertical axis plots the peak power density. In the example of FIG. 35, a focal length of the lens (focal length of laser beam) is 50.18 mm. At this position (focal position), the peak power density becomes 27.2 MW/cm² at maximum. (a) of FIG. 36 illustrates a light intensity distribution after propagation by 50.13 mm, (b) illustrates a light intensity distribution after propagation by 50.18 mm, and (c) illustrates a light intensity distribution after propagation by 50.23 mm.

Referring to FIG. 35, the change in peak power density of the laser beam after the laser beam passes through the aspherical lens is asymmetric about the focal position. In particular, the change in peak power density is steep at the lens side (left side in FIG. 35) with respect to the focal position as a central axis, and is rapidly decreased from the focal position toward the lens side. In contrast, as compared with the lens side, the change in peak power density is gentle at the far side from the lens (right side in FIG. 35) with respect to the focal position as the center axis, and the peak power density is held high even when a distance from the lens is increased.

The asymmetric property of the peak power density can be represented by an index of X1/X2 which is a ratio of X1 to X2 where X1 is a larger distance and X2 is a smaller distance from the focal position when the peak power density is decreased to a half maximum about the focal position serving as the central axis. In the example shown in FIG. 35, X coordinates of intersections of a line indicating 13.6 $MW/cm^2$, which is a half maximum of the maximum value of 27.2 $MW/cm^2$ of the peak power density, and a curve indicating change in peak power density are 50.14 and 50.25. Thus, X1 is 0.07 and X2 is 0.04. The ratio of X1/X2 is 1.75.

Alternatively, instead of the distance from the focal position when the peak power density becomes the half maximum, a distance from the focal position when the peak power density becomes $1/e^2 (\cong 0.135)$ may be used to obtain the index of asymmetric property. In the example shown in FIG. 35, X coordinates of intersections of a line indicating 3.7 $MW/cm^2$, which is 0.135 times the maximum value of 27.2 $MW/cm^2$ of the peak power density, and a curve indicating change in peak power density are 50.12 and 50.34. Thus, X1 is 0.16 and X2 is 0.06. The ratio of X1/X2 is 2.67.

The ratio (X1/X2) may be preferably in a range of $1<X1/X2 \leqq 10$. Within this range, when the peak power density is held with an intensity for processing a brittle material, and the peak power density becomes asymmetric about the focal position, high speed and high quality processing of the brittle material can be performed.

Regarding the asymmetric property of the propagating characteristic of the peak power, for example, when the peak power density is asymmetric such that a condition with a high peak power density more frequently appears at the rear side of the focal position of the laser beam (far side from the lens), the condition with the high peak power density is held in an area near the inside of the brittle material with respect to the focal position. Thus, energy of the laser beam can be efficiently absorbed by the brittle material. As a result, for example, when cutting is performed, cutting at a higher speed than the speed with the conventional condensing lens can be provided. Also, an enter length of the energy to the inside of the brittle material can be adjusted by adjusting the asymmetric property of the peak power density. Accordingly, the entering of unnecessary energy to the inside of the material can be suppressed. A problem such as chipping, taper, or dulling is reliably prevented at the laser exit side. The material surface can be processed with high precision. As a result, for example, a tool with a predetermined shape can be manufactured merely by laser processing. Even if processing is needed in a later process, a certain amount of processing can be decreased, thereby improving productivity.

In contrast, when the peak power density is asymmetric such that the condition with the high peak power density more frequently appears at the lens side with respect to the brittle material, a rapid increase in power density can be obtained. For example, processing, such as boring in a transparent material or forming of a micro crack, in which energy is locally absorbed into the surface or inside of the brittle material, is properly performed.

Further, by adjusting the asymmetric property of the change in peak power density, the configuration can be applied to reforming of a surface of a brittle material, annealing or dividing of a semiconductor. In the annealing of the semiconductor, the asymmetric property of the change in peak power density is adjusted, and hence, a depth profile of a dopant can be adjusted.

In view of design, even when design is made to obtain a symmetric peak power density, the peak power density may be asymmetric in a sense of not exactly being symmetric because of a manufacturing error, or unevenness of a material. It is to be noted that the above case is completely different from the present invention.

By the cutting as described above, and by grinding if necessary, various members made of the brittle material can be manufactured. For example, when single crystal diamond is used, this is cut into a predetermined shape with predetermined dimensions. Accordingly, a heat sink member, a die member, a dresser member, a cutting tool member, or the like, can be manufactured.

EXAMPLE

Figure 37:
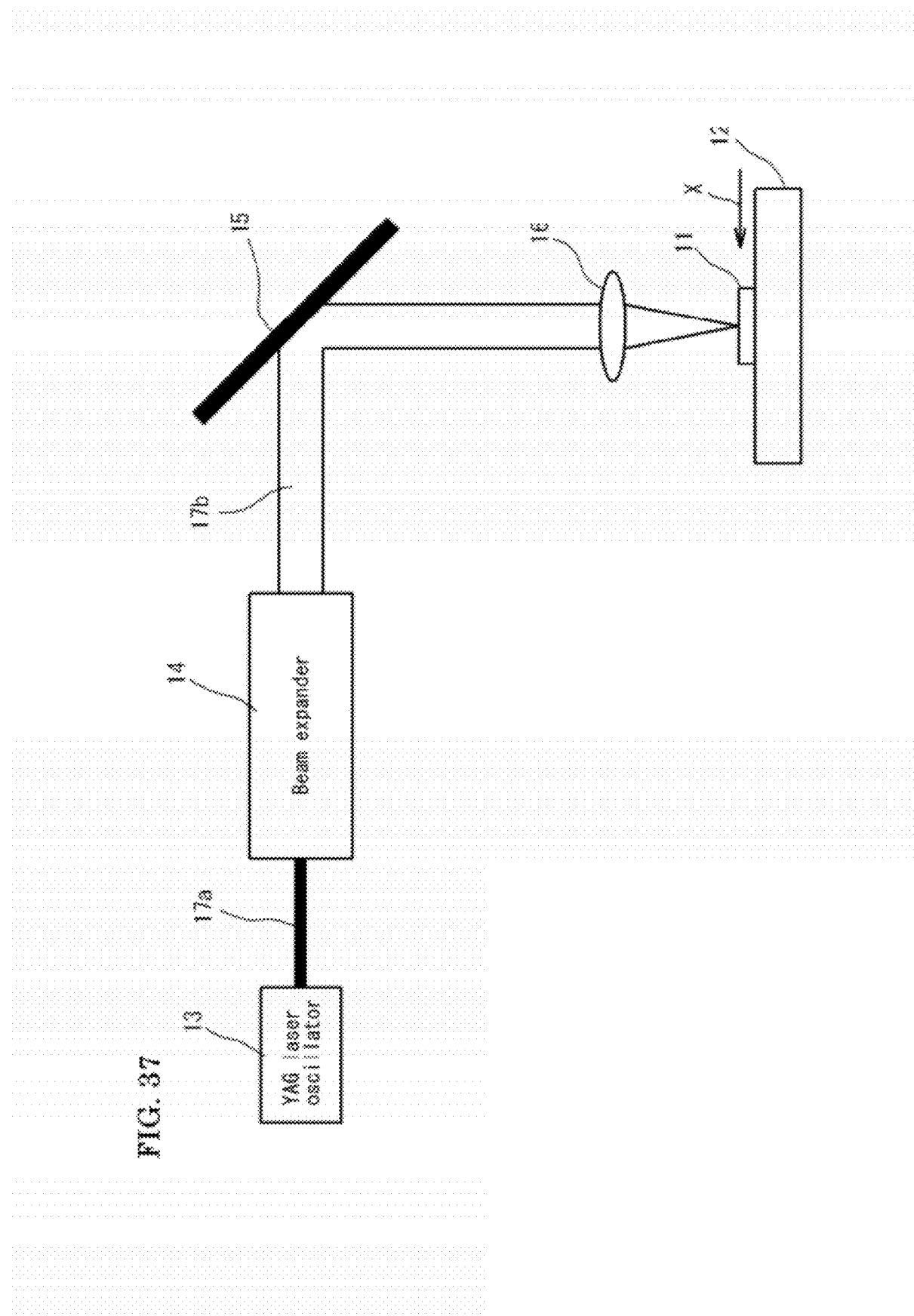
FIG. 37 is a schematic explanatory view showing an optical system used in Example.

An optical system shown in FIG. 37 was used to cut single crystal diamond. Single crystal diamond 11 had a thickness of 0.8 mm. The single crystal diamond 11 was synthetic single crystal diamond formed by melting a raw material carbon into a metal solvent at a very high pressure of 5 GPa or higher and a high temperature of 1300° C. or higher and causing the raw material carbon to grow on a seed crystal in the metal solvent by a temperature difference method. The single crystal diamond 11 was placed on a glass substrate 12 with a thickness of 3 mm.

A YAG laser oscillator 13 with an output of 7 W was used as the laser oscillator. A laser beam 17a generated by the YAG laser oscillator 13 was a pulse laser with a repetition period of 3 kHz having a fundamental wavelength of 1064 nm. The diameter of the laser beam 17a to be generated was increased five times by a beam expander 14, thereby providing a laser beam 17b with a diameter of 10 mm. The direction of the laser beam 17b was changed by 90° by a folding mirror 15, and was condensed by an aspherical lens 16. Then, a predetermined position of the single crystal diamond 11 was irradiated with the laser beam 17b for cutting (referring to FIG. 37, a laser beam scans in a direction perpendicular to the drawing surface and cut the workpiece).

The aspherical lens 16 was fabricated of synthetic quartz with a refractive index of 1.44963099 and a wavelength of 1064 nm. The aspherical lens 16 had a focal length of 50.18 mm, and its surface was treated with AR (anti reflection) coating. Table II shows other specifications of the aspherical lens 16. In Table II, reference character D denotes a lens diameter (mm), CA denotes a lens effective diameter (mm), CT denotes a lens center thickness (mm), ET denotes a lens edge thickness (mm), and $A_2$ to $A_{20}$ denote aspherical coefficients.

TABLE II

| | |
|---|---|
| D | 30 |
| CA | 25 |
| CT | 10 |
| ET | 6.87 |
| A2 | −1.94362778632000E−02 |

TABLE II-continued

| A4 | -4.23897523122300E-06 |
|---|---|
| A6 | 9.35323567885700E-09 |
| A8 | -5.64949597661100E-11 |
| A10 | -1.33458247423900E-13 |
| A12 | 5.54141910024600E-15 |
| A14 | -5.15461557614000E-17 |
| A16 | 2.63319077719600E-19 |
| A18 | -7.51740724741500E-22 |
| A20 | 9.40654471362200E-25 |

A curved surface of an aspherical lens can be expressed by Eq. 1 as follows.

$$Z_{(r)} = \sum_{n=1}^{10} A_{2n} r^{2n} \quad \text{[Equation 1]}$$

In Eq. 1, reference character r denotes a distance in a radial direction of a lens (lens radius). Since the lens has a centrosymmetric property, a coefficient of an odd-number-th order is 0. Thus, only an aspherical coefficient of an even-number-th order may be obtained.

Comparative Example

Comparative example is different from Example in that a planoconvex lens with a focal length of 50.18 mm (a surface of which is treated with AR coating by a thickness of 1064 nm) was used instead of the aspherical lens 16. Other structure was similar to that of Example, and the single crystal diamond 11 was cut.

Figure 38:
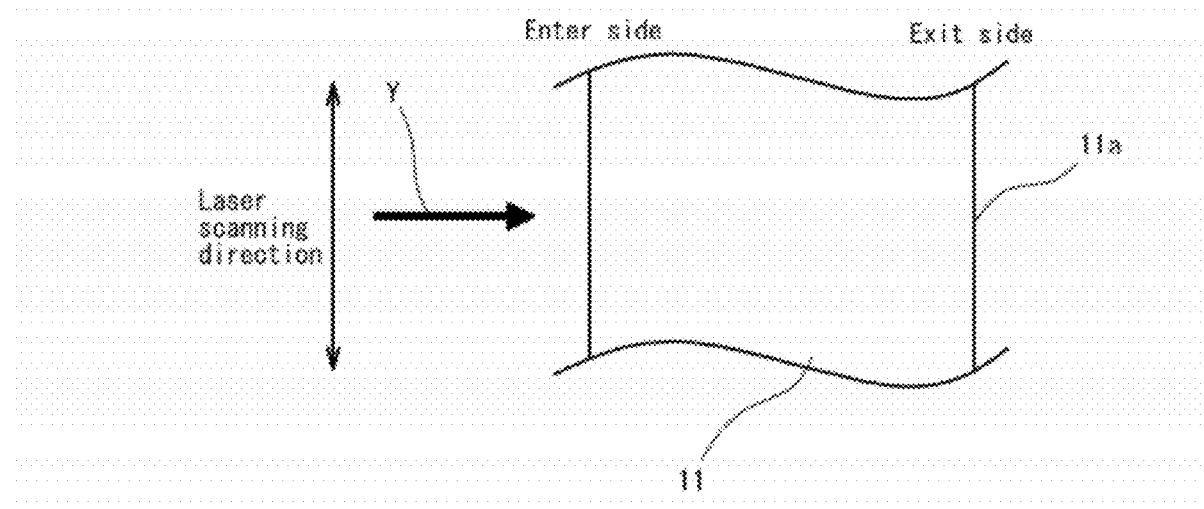
FIG. 38 is an explanatory view showing a cross section of single crystal diamond cut in Example, in which (a) is an explanatory view from the front side of a cut surface, and (b) is an explanatory view from the lateral side of the cut surface.
Figure 38:
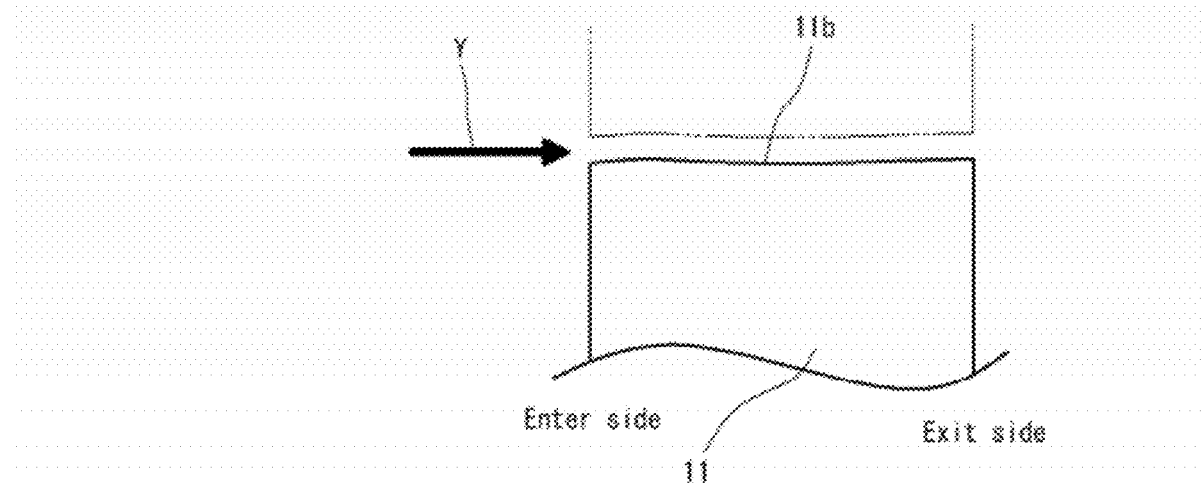
Figure 39:
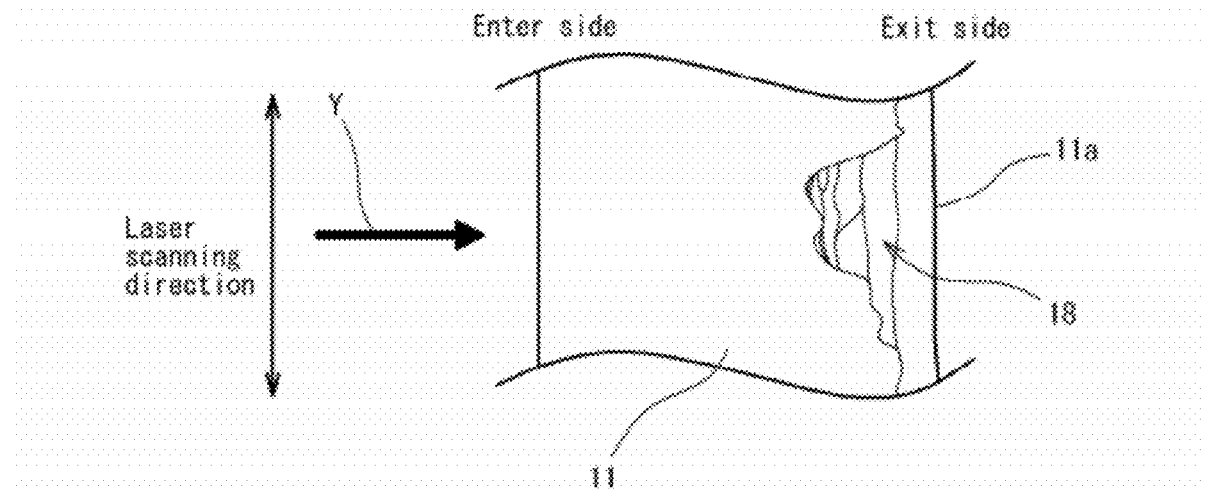
FIG. 39 is an explanatory view showing a cross section of single crystal diamond cut in Comparative example, in which (a) is an explanatory view from the front side of a cut surface, and (b) is an explanatory view from the lateral side of the cut surface.
Figure 39:
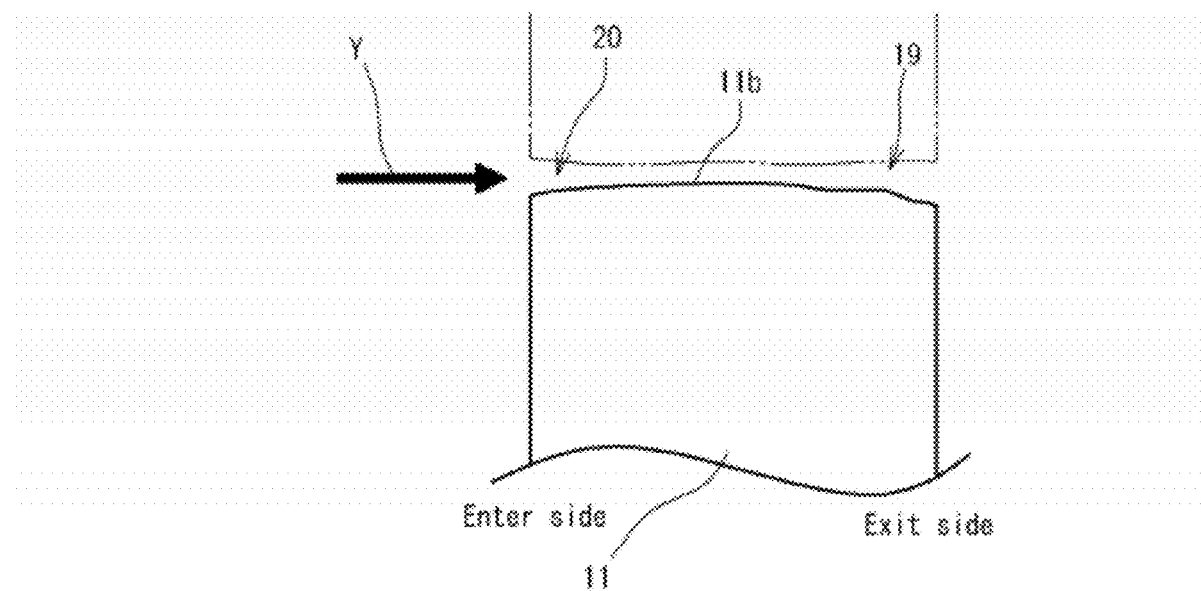
Figure 40:
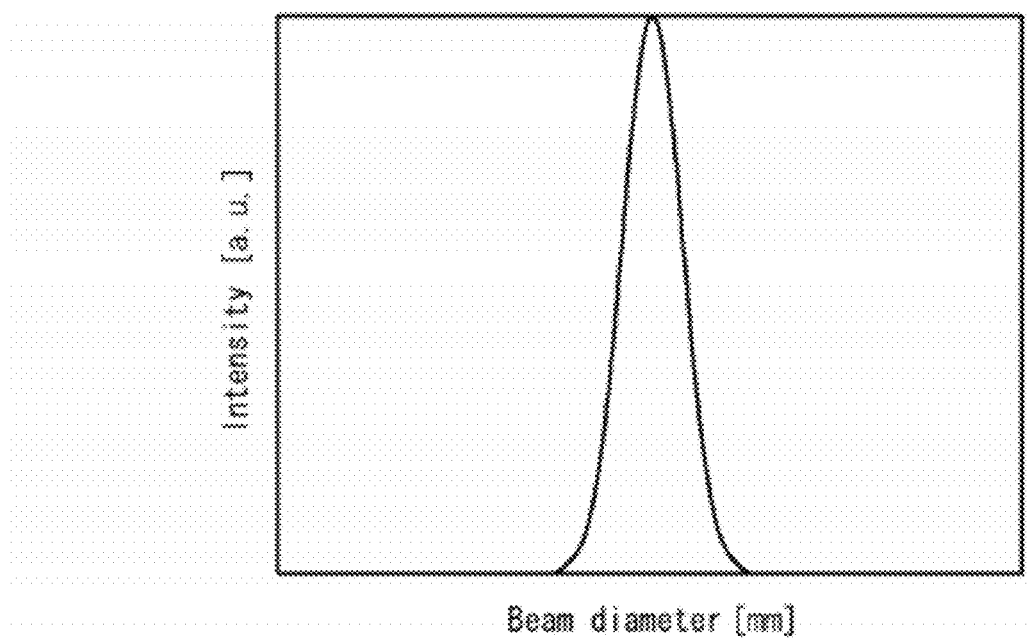
FIG. 40 is an illustration showing an ideal Gaussian distribution.
Figure 41:
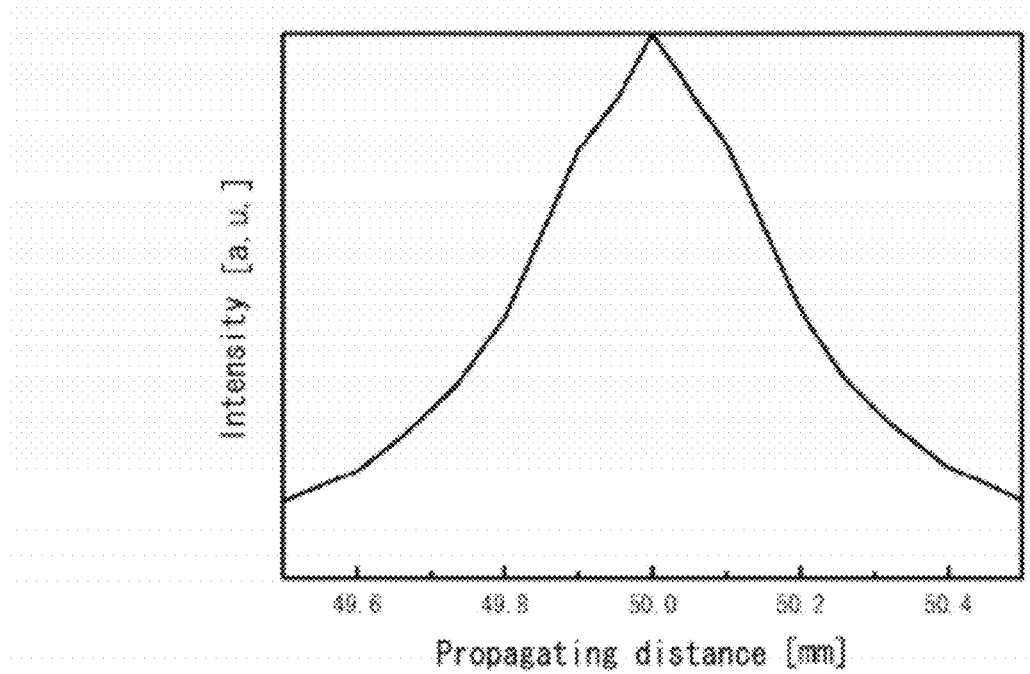
FIG. 41 is an illustration showing change in peak power density of a laser beam passing through a conventional condensing lens.

FIGS. 38 and 39 illustrate cross sections of single crystal diamond cut in Example and Comparative example. In FIGS. 38 and 39, (a) is an explanatory view from the front side of a cut surface, i.e., when viewed in a direction indicated by arrow X in FIG. 37, and (b) is an explanatory view from the lateral side of the cut surface, i.e., when viewed from a near side of the drawing surface of FIG. 37. In FIGS. 38 and 39, a laser beam was emitted from a direction indicated by arrow Y.

As found through the comparison between (a) in FIG. 38 and (a) in FIG. 39, almost no disorder appears at a cross section 11a at the laser exit side in Example in which the laser beam is condensed by the aspherical lens 16, whereas noticeable chipping 18 appears at the laser exit side in Comparative example in which the laser beam is condensed by the conventional planoconvex lens. Also, as found through the comparison between (b) in FIG. 38 and (b) in FIG. 39, no dulling or no taper appears at a cut surface 11b in Example, whereas dulling 19 (at the laser enter side and exit side) and taper 20 (laser enter side) appear in Comparative example.

Further, regarding a processing speed, cutting of the single crystal diamond 11 was completed by 120 seconds in Example, whereas the cutting took 150 seconds in Comparative example. In Example, cutting was performed at a processing speed about 1.4 times the processing speed of Comparative example.

The invention claimed is:

1. A condensing optical system that condenses a laser beam generated by a laser source at a predetermined focal length, wherein the condensing optical system produces spherical aberration to increase a focal depth, and wherein Expressions (a) and (b) are satisfied as follows:

$$|Z_8| \geq 0.1\lambda \text{ or } |Z_{15}| \geq 0.05\lambda, \quad (a)$$

$$Z_8/Z_{15} \geq 3 \text{ or } Z_8/Z_{15} < 1, \quad (b)$$

where $\lambda$ is a wavelength, $Z_8$ is an 8th coefficient of coefficients of the Zernike fringe polynomial of wavefront aberration corresponding to a 3rd order spherical aberration and $Z_{15}$ is a 15th coefficient of the coefficients of the Zernike fringe polynomial of wavefront aberration corresponding to a 5th spherical aberration, and $Z_{15}$ is a 15th coefficient of the coefficients of the Zernike fringe polynomial of wavefront aberration corresponding to a 5th spherical aberration.

2. The condensing optical system according to claim 1, wherein Expressions (c) and (d) are further satisfied as follows:

$$|Z_8| < 1.4\lambda, \text{ and} \quad (c)$$

$$|Z_{15}| < 0.5\lambda. \quad (d)$$

3. The condensing optical system according to claim 1, wherein the condensing optical system is a single aspherical lens or a single diffractive condensing lens.

4. The condensing optical system according to claim 1, wherein the condensing optical system is a compound optical system.

5. The condensing optical system according to claim 4, wherein the compound optical system includes first optical means having a light condensing function and second optical means having a spherical aberration producing function.

6. The condensing optical system according to claim 5, wherein the second optical means is an aspherical phase plate or a diffractive phase plate.

7. The condensing optical system according to claim 5, further comprising laser beam deflecting means which is a polygonal mirror or a galvanometer mirror, wherein the first optical means is an fθ lens.

8. A laser processing method comprising irradiating a material with a laser beam to process the material by using the condensing optical system according to claim 1,
wherein an $M^2$ value which indicates a light condensing property of the laser beam is $M^2 < 2$, and the wavelength $\lambda$ of the laser beam is 100 nm $\leq \lambda \leq$ 20000 nm, and
wherein change in peak power density of the laser beam in an optical-axis direction is asymmetric about a focal position of the laser beam through the condensing optical system.

9. The laser processing method according to claim 8, wherein the peak power density of the laser beam is changed such that X1/X2 is in a range of 1<X1/X2≦10 where X1 is a larger distance and X2 is a smaller distance from the focal position when the peak power density of the laser beam is decreased to a half maximum about the focal position as a central axis.

10. The laser processing method according to claim 9, wherein the material is cut with the laser beam, the peak power density of the laser beam being changed to be asymmetric about the focal position so that X2 is arranged at a lens side and X1 is arranged at a far side from the lens.

11. A laser processing apparatus that irradiates a material with a laser beam to process the material by using the condensing optical system according to claim 1,
wherein an $M^2$ value which indicates a light condensing property of the laser beam is $M^2 < 2$, and the wavelength $\lambda$ of the laser beam is 100 nm $\leq \lambda \leq$ 20000 nm, and
wherein change in peak power density of the laser beam in an optical-axis direction is asymmetric about a focal position of the laser beam through the condensing optical system.

12. A manufacturing method of a brittle material blank comprising irradiating a brittle material with a laser beam by using the condensing optical system according to claim 1, and processing the material,
   wherein an $M^2$ value which indicates a light condensing property of the laser beam is $M^2<2$, and the wavelength $\lambda$ of the laser beam is 100 nm$\leqq\lambda\leqq$20000 nm, and
   wherein change in peak power density of the laser beam in an optical-axis direction is asymmetric about a focal position of the laser beam through the condensing optical system.

13. The manufacturing method of the brittle material blank according to claim 12, wherein the brittle material is single crystal diamond, polycrystalline diamond, sintered cubic boron nitride, compound sintered compact or cemented carbide, the compound sintered compact including a layer of cubic boron nitride and a layer of the cemented carbide.

* * * * *

UNITED STATES PATENT AND TRADEMARK OFFICE
CERTIFICATE OF CORRECTION

| | | |
|---|---|---|
| PATENT NO. | : 8,338,744 B2 | Page 1 of 1 |
| APPLICATION NO. | : 12/516336 | |
| DATED | : December 25, 2012 | |
| INVENTOR(S) | : Kenichi Watatani et al. | |

It is certified that error appears in the above-identified patent and that said Letters Patent is hereby corrected as shown below:

On the Title Page

Item (73) in the Assignee listing, please add the following Assignee name and address:

SUMITOMO ELECTRIC HARDMETAL CORP., Hyogo (JP).

Signed and Sealed this
Tenth Day of September, 2013

Teresa Stanek Rea
*Acting Director of the United States Patent and Trademark Office*